United States Patent
Abe et al.

(10) Patent No.: US 11,047,166 B2
(45) Date of Patent: Jun. 29, 2021

(54) GLASS PANEL UNIT

(71) Applicant: Panasonic Intellectual Property Management Co., Ltd., Osaka (JP)

(72) Inventors: Hiroyuki Abe, Osaka (JP); Eiichi Uriu, Osaka (JP); Tasuku Ishibashi, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/683,021

(22) Filed: Nov. 13, 2019

(65) Prior Publication Data

US 2020/0080363 A1   Mar. 12, 2020

Related U.S. Application Data

(63) Continuation of application No. 15/528,165, filed as application No. PCT/JP2015/005908 on Nov. 27, 2015, now Pat. No. 10,519,710.

(30) Foreign Application Priority Data

Nov. 27, 2014   (JP) .................................. 2014-240319

(51) Int. Cl.
*E06B 3/66*   (2006.01)
*C03C 27/06*   (2006.01)
(Continued)

(52) U.S. Cl.
CPC ............ *E06B 3/6612* (2013.01); *C03C 27/06* (2013.01); *C03C 27/10* (2013.01);
(Continued)

(58) Field of Classification Search
CPC ............... E06B 3/6612; E06B 3/66304; E06B 3/66333; E06B 3/66328; E06B 3/66319; Y02B 80/22; Y02A 30/249
See application file for complete search history.

(56) References Cited

U.S. PATENT DOCUMENTS

| 5,124,185 | A | 6/1992 | Kerr et al. |
| 5,173,561 | A | 12/1992 | Gupta |

(Continued)

FOREIGN PATENT DOCUMENTS

| JP | 2002-294185 A | 10/2002 |
| JP | 2011-094059 A | 5/2012 |
| WO | 2013/172034 A1 | 11/2013 |

OTHER PUBLICATIONS

International Search Report issued in Application No. PCT/JP2015/005908 dated Feb. 2, 2016, with English translation.
(Continued)

*Primary Examiner* — Donald J Loney
(74) *Attorney, Agent, or Firm* — McDermott Will & Emery LLP

(57) ABSTRACT

The glass panel unit includes a first glass panel, a second glass panel, a seal, an evacuated space, and a spacer. The second glass panel is placed opposite the first glass panel. The seal with a frame shape hermetically bonds the first glass panel and the second glass panel to each other. The evacuated space is enclosed by the first glass panel, the second glass panel, and the seal. The spacer is placed between the first glass panel and the second glass panel. The spacer is a stack of two or more films. At least one film of the two or more films contains a polymer having a viscoelastic coefficient at 400° C. larger than 500 MPa.

7 Claims, 11 Drawing Sheets

(51) Int. Cl.
*C03C 27/10* (2006.01)
*E06B 3/663* (2006.01)

(52) U.S. Cl.
CPC ...... *E06B 3/66304* (2013.01); *E06B 3/66319* (2013.01); *E06B 3/66328* (2013.01); *E06B 3/66333* (2013.01); *Y02A 30/249* (2018.01); *Y02B 80/22* (2013.01)

(56) References Cited

U.S. PATENT DOCUMENTS

| | | | |
|---|---|---|---|
| 6,479,112 B1 * | 11/2002 | Shukuri | E06B 3/6612 428/34 |
| 6,541,084 B2 | 4/2003 | Wang | |
| 10,519,710 B2 * | 12/2019 | Abe | C03C 27/10 |
| 10,533,365 B2 * | 1/2020 | Abe | E06B 3/66304 |
| 2002/0106463 A1 | 8/2002 | Wang et al. | |
| 2010/0272933 A1 | 10/2010 | McCormick et al. | |
| 2012/0088045 A1 | 4/2012 | Veerasamy | |
| 2014/0335353 A1 | 11/2014 | Maeno | |
| 2015/0068665 A1 | 3/2015 | Abe et al. | |

OTHER PUBLICATIONS

Extended European Search Report issued in Application No. 15862623.4 dated Oct. 5, 2017.
Non-Final Office Action issued in U.S. Appl. No. 15/528,165, dated Feb. 21, 2019.
Notice of Allowance issued in U.S. Appl. No. 15/528,165, dated Aug. 8, 2019.
Eurasian Office Action issued in corresponding Eurasian Patent Application No. 201992438, dated Feb. 10, 2021, with English translation.

* cited by examiner

GLASS PANEL UNIT

RELATED APPLICATIONS

This application is a continuation of U.S. application Ser. No. 15/528,165, filed May 19, 2017, which is the U.S. National Phase under 35 U.S.C. § 371 of International Application No. PCT/JP2015/005908, filed on Nov. 27, 2015, which in turn claims the benefit of Japanese Application No. 2014-240319, filed on Nov. 27, 2014, the disclosures of which are incorporated by reference herein.

TECHNICAL FIELD

The present disclosure relates to glass panel units.

BACKGROUND ART

There has been known a glass panel unit in which two or more glass panels are stacked with one or more gaps in-between to form one or more hermetically enclosed spaces, and the spaces are made to be in a vacuum state. This type of glass panel unit is referred to as a multiple glass panel. This type of glass panel unit is also referred to as a vacuum insulated glass panel. This glass panel unit has high thermal insulating properties. It is important that the glass panel unit keeps the vacuum state.

There has been proposed use of spacers to keep a thickness of the evacuated space inside the glass panel unit. The spacers are materials sandwiched between the two glass panels. The spacers are required to have strength to some extent. The spacers are frequently made of metal. In contrast, U.S. Pat. No. 6,541,084 B2 discloses spacers made of polymer. According to this technique, using polymer as material of spacers may give flexibility to the spacers. However, the spacers made of polymer are considered to have difficulties in keeping the thickness of the evacuated space.

SUMMARY OF INVENTION

An object of the present disclosure would be to propose a glass panel unit allowing stable formation of an evacuated space.

The glass panel unit is disclosed. The glass panel unit includes a first glass panel, a second glass panel, a seal, an evacuated space, and at least one spacer. The second glass panel is placed opposite the first glass panel. The seal with a frame shape hermetically bonds the first glass panel and the second glass panel to each other. The evacuated space is enclosed by the first glass panel, the second glass panel, and the seal. The at least one spacer is placed between the first glass panel and the second glass panel. The spacer may preferably contain polyimide having benzoxazole structures. Alternatively, the at least one spacer may preferably contain a polymer having a viscoelastic coefficient at 400° C. larger than 500 MPa.

The glass panel unit of the present disclosure allows stable formation of the evacuated space.

DESCRIPTION OF EMBODIMENTS

The following disclosure relates to glass panel units. In particular, the following disclosure relates to a glass panel unit where an evacuated space is formed between a pair of glass panels.

Figure 1:
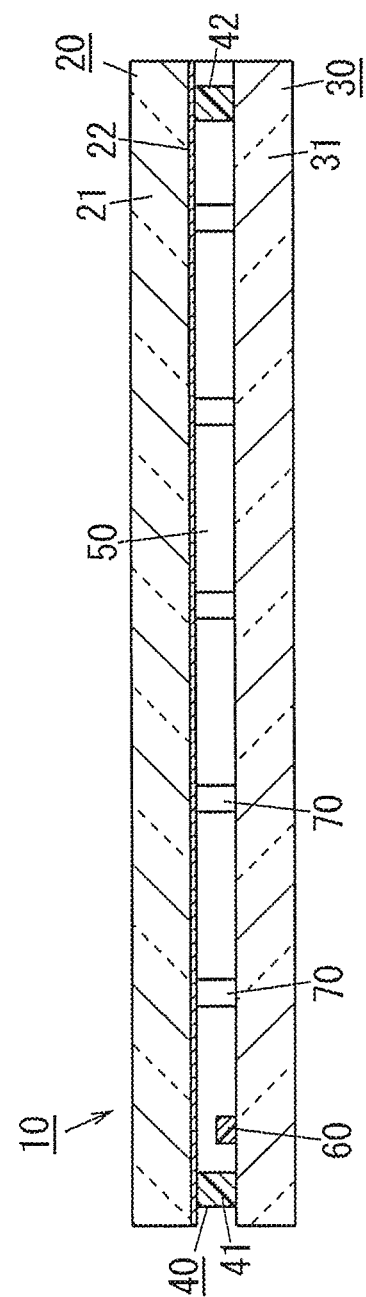
FIG. 1 is a schematic section of a glass panel unit of one example.
Figure 2:
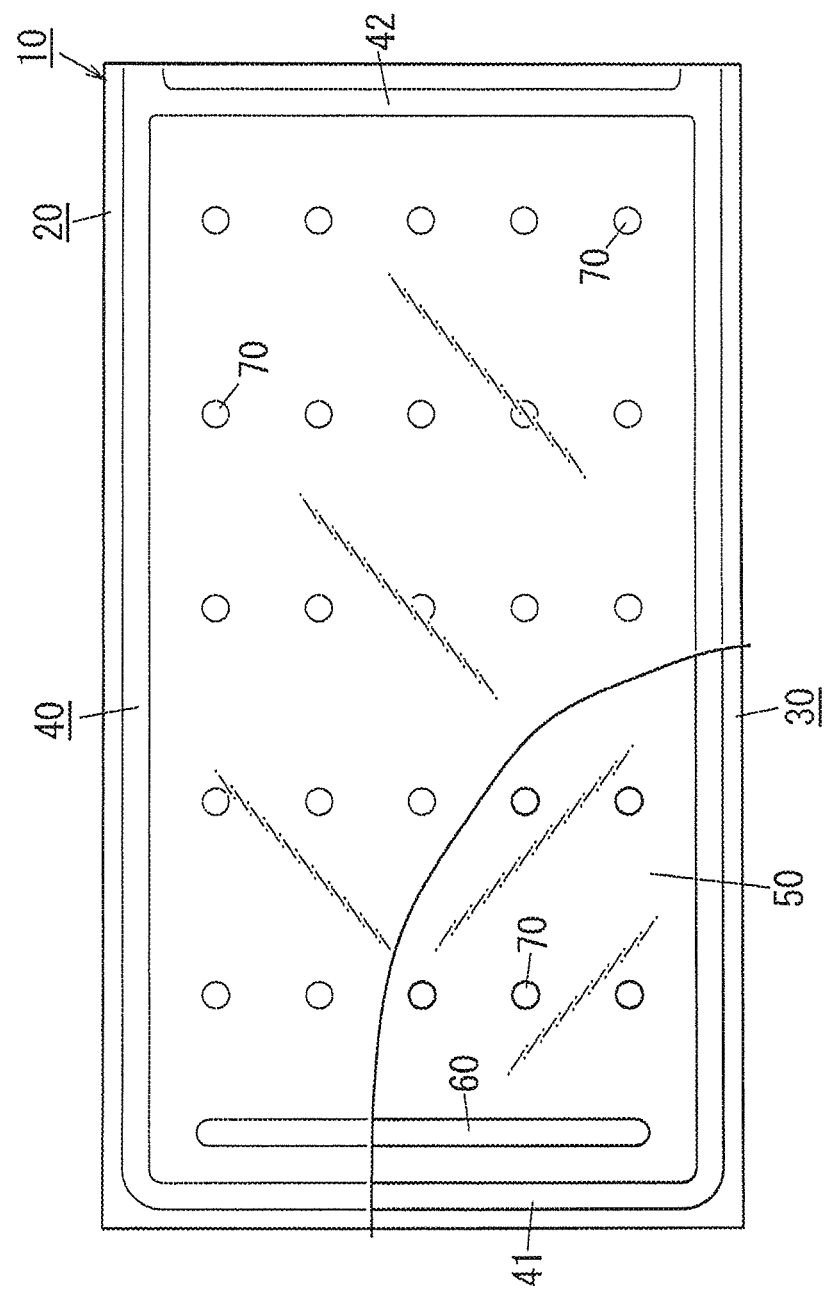
FIG. 2 is a schematic plan of the glass panel unit of the example.

FIG. 1 and FIG. 2 show a glass panel unit 10 of one embodiment. The glass panel unit 10 of the present embodiment is a vacuum insulated glass unit. The vacuum insulated glass unit is a type of multiple glass panels including at least one pair of glass panels, and includes an evacuated space 50 between the pair of glass panels. Note that, in FIG. 2, to facilitate understanding of the internal structure only, the first glass panel 20 is illustrated with part (left and lower part) thereof being cutaway, Note that, upward, downward, left, and right directions in the figures are determined based on a direction of allowing reading reference numbers correctly.

The glass panel unit 10 includes the first glass panel 20, a second glass panel 30, a seal 40, the evacuated space 50, and spacers 70. The second glass panel 30 is placed opposite the first glass panel 20. The seal 40 with a frame shape hermetically bonds the first glass panel 20 and the second glass panel 30 to each other. The evacuated space 50 is enclosed by the first glass panel 20, the second glass panel 30, and the seal 40. The spacers 70 are placed between the first glass panel 20 and the second glass panel 30. The spacers 70 include polyimide having benzoxazole structures.

As for the glass panel unit 10, the spacers 70 contain polyimide having the benzoxazole structures and as a result have increased strength. Further, the spacers 70 contain polyimide having the benzoxazole structures and as a result have elasticity. Additionally, the spacers 70 contain polyimide having the benzoxazole structures and as a result have increased thermal resistance. Therefore, the finely evacuated space 50 may be formed, and it is possible to produce the glass panel unit 10 with high resistance to external impact.

The first glass panel 20 includes a body 21 determining a plan shape of the first glass panel 20, and a coating 22. The body 21 is rectangular and includes a first face (external face; upper face in FIG. 1) and a second face (internal face; lower face in FIG. 1) in a thickness direction which are parallel to each other. Each of the first face and the second face of the body 21 is a flat face. Examples of material of the body 21 of the first glass panel 20 may include soda lime glass, high strain point glass, chemically strengthened glass, non-alkaline glass, quartz glass, neoceram, and physically strengthened glass. Note that, the first glass panel 20 does not need to include the coating 22. The first glass panel 20 may be constituted by the body 21 only.

The coating 22 is formed on the second face of the body 21. The coating 22 may preferably be an infrared reflective film. Note that, the coating 22 is not limited to such an infrared reflective film but may be a film with desired physical properties.

The second glass panel 30 includes a body 31 determining a plan shape of the second glass panel 30. The body 31 is rectangular and includes a first face (internal face; upper face in FIG. 1) and a second face (external face; lower face in FIG. 1) in a thickness direction which are parallel to each other. Each of the first face and the second face of the body 31 is a flat face. Examples of material of the body 31 of the second glass panel 30 may include soda lime glass, high strain point glass, chemically strengthened glass, non-alkaline glass, quartz glass, neoceram, and physically strengthened glass. The material of the body 31 may be same as the material of the body 21. The body 31 has the same plan shape with the body 21, Stated differently, the second glass panel 30 has the same plan shape with the first glass panel 20.

The second glass panel 30 includes the body 31 only. In other words, the body 31 forms the second glass panel 30 by itself. The second glass panel 30 may include a coating. The coating may be formed on the first face of the body 31. This coating may have properties same as the coating 22 of the first glass panel 20.

The first glass panel 20 and the second glass panel 30 are arranged so that the second face of the body 21 and the first face of the body 31 face and parallel to each other. In other words, the first face of the body 21 is directed outward from the glass panel unit 10, and the second face of the body 21 is directed inward of the glass panel unit 10. Further, the first face of the body 31 is directed inward of the glass panel unit 10, and the second face of the body 31 is directed outward from the glass panel unit 10.

A thickness of the first glass panel 20 is not limited particularly, but may be in a range of 1 to 10 mm. A thickness of the second glass panel 30 is not limited particularly, but may be in a range of 1 to 10 mm. The first glass panel 20 and the second glass panel 30 may have the same thickness or different thicknesses. When the first glass panel 20 and the second glass panel 30 have the same thickness, formation of the glass panel unit 10 is facilitated. In a plan view, outlines of the first glass panel 20 and the second glass panel 30 are aligned with each other.

In FIG. 1 and FIG. 2, the glass panel unit 10 further includes a gas adsorbent 60. The gas adsorbent 60 is placed inside the evacuated space 50. In the present embodiment, the gas adsorbent 60 has an elongated shape. The gas adsorbent 60 is formed on a second end (left end in FIG. 2) in the lengthwise direction of the second glass panel 30 to extend along the width direction of the second glass panel 30. In summary, the gas adsorbent 60 is placed on one end of the evacuated space 50. According to this arrangement, the gas adsorbent 60 can be unlikely to be perceived. In a case of directly placing the gas adsorbent 60 on a glass panel, placement of the gas adsorbent 60 can be facilitated. Note that, the gas adsorbent 60 may be provided in any position in the evacuated space 50.

The gas adsorbent 60 is used to adsorb unnecessary gas (for example, residual gas). The unnecessary gas may include gas emitted in forming the seal 40. The unnecessary gas may further include gas intruding into an inside through a gap in the seal 40. An increase in such gas may cause a decrease the degree of vacuum and thus a decrease in the thermal insulating properties.

The gas adsorbent 60 includes a getter. The getter is a substance having properties of adsorbing molecules smaller than a predetermined size. The getter may be an evaporative getter. Examples of the evaporative getter may include zeolite and ion-exchanged zeolite.

The seal 40 encloses the evacuated space 50 completely and bonds the first glass panel 20 and the second glass panel 30 to each other hermetically. The seal 40 is placed between the first glass panel 20 and the second glass panel 30. The seal 40 has a rectangular frame shape. The evacuated space 50 has a degree of vacuum equal to or lower than a predetermined value. The predetermined value may be 0.1 Pa, for example. The evacuated space 50 may be formed by evacuation. The evacuation may include forming a hole for evacuation in at least one of the first glass panel 20, the second glass panel 30, and the seal 40 and removing gas from an inside. However, it is preferable that both the first glass panel 20 and the second glass panel 30 do not include any outlet by the following evacuation. In this case, it is possible to produce the glass panel unit 10 with an improved appearance. In FIG. 1, neither the first glass panel 20 nor the second glass panel 30 includes an outlet.

The evacuated space 50 can be made to be in a vacuum state by conducting evacuation while heating. Heating may lead to an increase in the degree of vacuum. Additionally, such heating may cause formation of the seal 40. A temperature for heating to form a vacuum state may be equal to or higher than 300° C. This condition may contribute to an increase in the degree of vacuum. A concrete method of forming the evacuated space 50 may be described later.

The seal 40 is formed of thermal adhesive. Examples of the thermal adhesive may include glass frit. Examples of the glass frit may include low-melting-point glass fit, Examples of the low-melting-point glass frit may include bismuth-based glass frit, lead-based glass frit, and vanadium-based glass frit. The seal 40 may be made of multiple thermal adhesives, as described below.

The glass panel unit 10 includes multiple spacers 70, The multiple spacers 70 are used to keep a predetermined interval between the first glass panel 20 and the second glass panel 30, The multiple spacers 70 allow reliably ensuring the space between the first glass panel 20 and the second glass panel 30. The number of spacers 70 may be one but preferably two or more in order to keep a thickness of a space between the glass panels. Provision of multiple spacers 70 may lead to an increase in strength of the glass panel unit 10.

The multiple spacers 70 are placed inside the evacuated space 50. In more detail, the multiple spacers 70 are placed at individual intersections of an imaginary rectangular lattice. For example, an interval between the multiple spacers 70 may be in a range of 1 to 10 cm, and in one example may be 2 cm. Note that, sizes of the spacers 70, the number of spacers 70, intervals between the spacers 70, and pattern of arrangement of the spacers 70 may be appropriately determined.

Each spacer 70 has a solid cylindrical shape with a height almost equal to the aforementioned predetermined interval (interval between the first glass panel 20 and the second glass panel 30), For example, each spacer 70 may have a diameter ranging from 0.1 to 10 mm and a height ranging from 10 to 1000 μm. In one example, each spacer 70 may have a diameter of 0.5 mm and a height of 100 μm. Note that, each spacer 70 may have a desired shape such as a solid prismatic shape and a spherical shape. The heights of the multiple spacers 70 determine the distance between the first glass panel 20 and the second glass panel 30 which means a thickness of the evacuated space 50. The evacuated space 50 may have a thickness ranging from 10 to 1000 μm, and in one example may have a thickness of 100 μm.

Each spacer 70 is made of light-transmissive, material, Thus, the multiple spacers 70 are unlikely to be perceived. Note that, each spacer 70 may be made of opaque material, providing that it is sufficiently small. Material of the spacers 70 is selected so that crush of the spacers 70 does not occur during a first melting step, an evacuating step, and a second melting step which are described later. For example, the material of the spacers 70 is selected to have a softening point (softening temperature) higher than a first softening point of a first thermal adhesive and a second softening point of a second thermal adhesive.

The spacers 70 include polyimide having the benzoxazole structures. Polyimide is polymer with a structure represented by the following general chemical formula (1).

[CHEMICAL FORMULA 1]

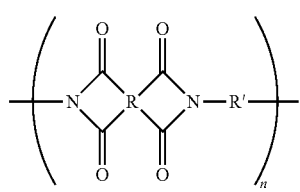

(1)

In the formula (1), R and R' are independent of one another and each represent an organic group, and "n" is an integer equal to or larger than one.

The benzoxazole structure is included in the structure shown by the above general chemical formula (1). It is preferable that the organic group R' in the general chemical formula (1) include the benzoxazole structure. Benzoxazole is represented by the chemical formula (2). By substituting one or more hydrogens in the benzoxazole of the chemical formula (2) with one or more other elements in the polyimide, the polyimide can have the benzoxazole structures. Preferably, the benzoxazole structure may be present in a main chain of polymer as a result of substitution of two or more hydrogens.

[CHEMICAL FORMULA 2]

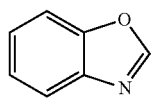

(2)

The polyimide having the benzoxazole structures may have phenyl-benzoxazole structures. Phenyl-benzoxazole is represented by the chemical formula (3). By substituting one or more hydrogens in the phenyl-benzoxazole of the chemical formula (3) with one or more other elements in the polyimide, the polyimide can have the phenyl-benzoxazole structures. Preferably, the phenyl-benzoxazole structure may be present in a main chain of polymer as a result of substitution of two or more hydrogens.

[CHEMICAL FORMULA 3]

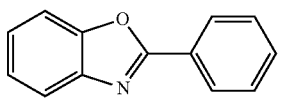

(3)

The polyimide having the benzoxazole structures may have phenylene-bis-benzoxazole structures. Phenylene-bis-benzoxazole is represented by the chemical formula (4). By substituting one or inure hydrogens in the phenylene-his-benzoxazole of the chemical formula (4) with one or more other elements in the polyimide, the polyimide can have the phenylene-bis-benzoxazole structures. Preferably, the phenylene-bis-benzoxazole structure may be present in a main chain of polymer as a result of substitution of two or more hydrogens.

[CHEMICAL FORMULA 4]

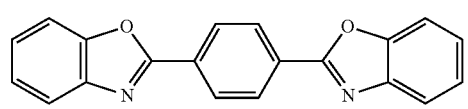

(4)

The polyimide having the benzoxazole structures may have diphenyl-benzo-bis-oxazole structures. Diphenyl-benzo-bis-oxazole is represented by the chemical formula (5). By substituting one or more hydrogens in the diphenyl-benzo-his-oxazole of the chemical formula (5) with one or more other elements in the polyimide, the polyimide can have the diphenyl-benzo-bis-oxazole structures. Preferably, the diphenyl-benzo-bis-oxazole structure may be present in a main chain of polymer as a result of substitution of two or more hydrogens,

[CHEMICAL FORMULA 5]

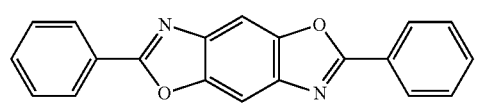

(5)

Polyimide is produced by polycondensation of diamines with tetracarboxylic acid anhydrides. The diamines may preferably include aromatic diamines. The tetracarboxylic acid anhydrides may preferably include aromatic tetracarboxylic acid anhydrides. It is preferable to use polyimide produced by reaction of aromatic diamines and aromatic tetracarboxylic acid anhydrides. The aromatic diamines may preferably have the benzoxazole structures. Use of the aromatic diamines may preferably have the benzoxazole structures allow resultant polyimide to have the benzoxazole structures.

Examples of the aromatic diamines having the benzoxazole structures may include materials represented by the following chemical formulae (6), (7), and (8).

[CHEMICAL FORMULA 6]

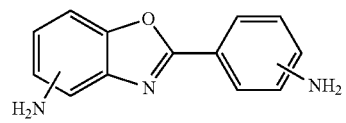

(6)

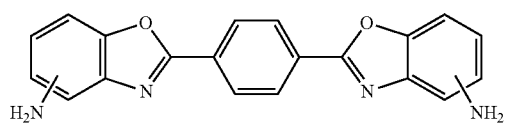

(7)

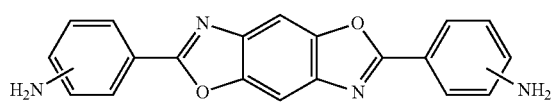

(8)

Concrete examples of the aromatic diamines having the benzoxazole structures may include 5-amino-2-(p-aminophenyl)benzoxazole, 6-amino-2-(p-aminophenyl)benzoxazole, 5-amino-2-(m-aminophenyl)benzoxazole, 6-amino-2-(m-aminophenyl)benzoxazole, 2,2-p-phenylenebis(5-aminobenzoxazole), 1,5-(5-aminobenzoxazolo)-4-(5-aminobenzoxazolo)benzene, 2,6-(4,4'-diaminodiphenyl)benzo[1,2-d:5,4-d']bisoxazole, 2,6-(4,4'-diaminodiphenyl)benzo[1,2-d:4,5-d']bisoxazole, 2,6-(3,4'-diaminodiphenyl)benzo[1,2-d:5,4-d']bisoxazole, 2,6-(3,4'-diaminodiphenyl)benzo[1,2-d:4,5-d']bisoxazole, 2,6-(3,3'-diaminodiphenyl)benzo[1,2-d:5,4-d']bisoxazole, 2,6-(3,3'-diaminodiphenyl)benzo[1,2-d:4,5-d']bisoxazole.

One type of these aromatic diamines may be used alone, or two or more types of them may be used in combination.

Examples of the aromatic tetracarboxylic acid anhydrides may include pyromellitic acid anhydrides, 3,3',4,4'-biphenyltetracarboxylic acid anhydrides, 4,4'-oxydiphthalic acid anhydrides, 3,3',4,4'-benzophenonetetracarboxylic acid anhydrides, 3,3',4,4'-diphenylsulfonetetracarboxylic acid anhydrides, 2,2-bis[4-(3,4-dicarboxyphenoxy)phenyl]propanoic acid anhydrides.

One type of these aromatic tetracarboxylic acid anhydrides may be used alone, or two or more types of them may be used in combination.

In the past, metal has been used for general material of spacers for glass panel units. However, metals are high in thermal conductivity and are considered not to be suitable for thermal insulation purpose, Additionally, metal is poor in elasticity and is unlikely to absorb impact. Hence, resultant glass panel units tend to be weak in impact. As another idea, glass or ceramics may be used for spacers. However, this may lead to a decrease in strength. As another idea, resins low in thermal conductivity may be used. However, it is difficult to select resins which satisfy strength and thermal resistance requirements. According to the glass panel unit of the present disclosure, the aforementioned polyimide forms the spacers 70 with high strength. The spacers 70 are elastic and cause an increase in resistance to impact. The spacers 70 have resistance to heat and thus are unlikely to be crushed. The spacers 70 are low in thermal conductivity and thus cause an increase in thermal insulating properties.

The spacers 70 may be preferably made of polyimide which has a viscoelastic coefficient at 400° C. equal to or larger than 500 MPa. As a result, the glass panel unit 10 with high strength can be produced. The polyimide may have a viscoelastic coefficient at 400° C. smaller than 1×10$^6$ MPa. As for the polyimide, a viscoelastic coefficient at 400° C. may be preferably larger than 1000 MPa and more preferably 1500 MPa and most preferably 2000 MPa. Viscoelastic coefficients can be measured with viscoelasticity measuring apparatus. Examples of viscoelasticity measuring apparatus may include a DMA (dynamic mechanical analyzer) and a TMA (thermomechanical analyzer). As for the polyimide contained in the spacer 70, a ratio of a viscoelastic coefficient V400 at 400° C. to a viscoelastic coefficient V20 at 20° C., which is given by V400/V20, may be equal to or larger than 0.1, This ratio (V400/V20) may be preferably equal to or larger than 0.2, and more preferably 0.3, and most preferably 0.4. The spacer 70 may be preferably made of polyimide having a coefficient of thermal expansion at 400° C. smaller than 10 ppm/° C. As a result, the glass panel unit 10 with high strength can be produced. As for the polyimide, a coefficient of thermal expansion at 400° C. may be larger than 0.1 ppm/° C. Coefficients of thermal expansion can be measured with coefficient of thermal expansion measuring apparatus. Examples of the apparatus may include a TMA (thermomechanical analyzer), More preferably, the spacer 70 may be made of polyimide which has a viscoelastic coefficient at 400° C. larger than 500 MPa and a coefficient of thermal expansion at 400° C. smaller than 10 ppm/° C.

In this regard, the spacer 70 may be preferably made of at least one polyimide films. Use of polyimide films can facilitate formation of the spacer 70. The at least one polyimide film can be cut to have a shape of the spacer 70 and be used as the spacer 70.

Figure 3:
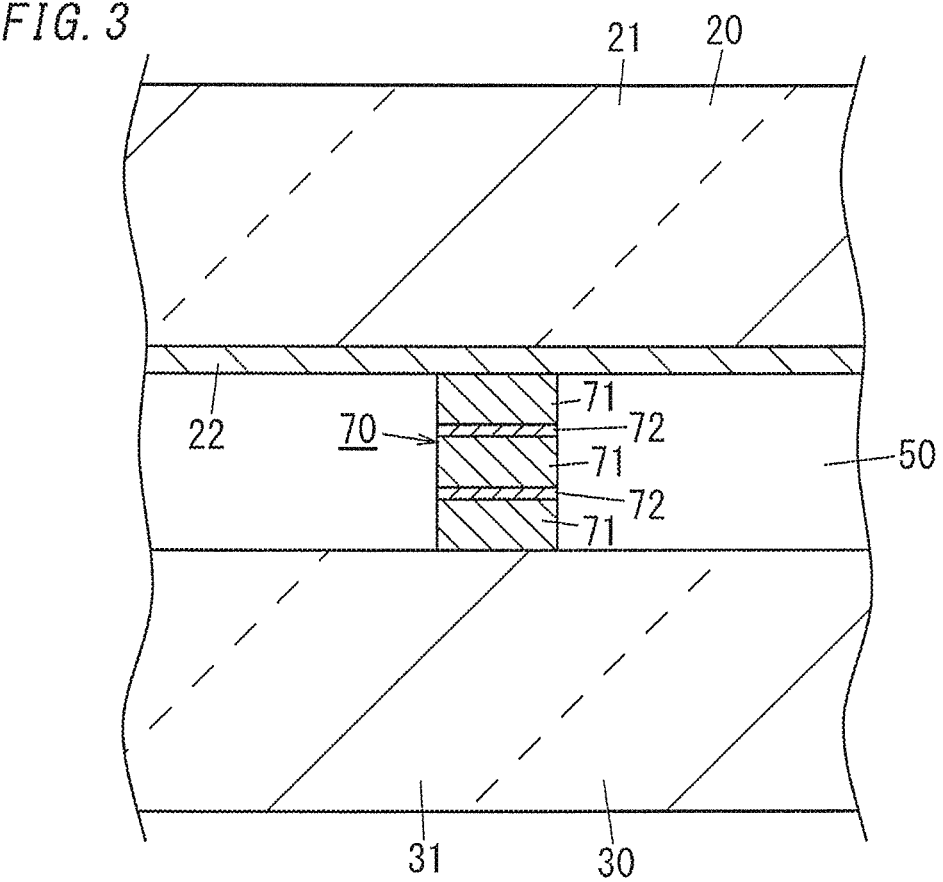
FIG. 3 is a schematic section of a spacer of one example.

FIG. 3 shows one example of the spacer 70. The spacer 70 may preferably be a stack of two or more films. The stack may include at least one polyimide film. The spacer 70 shown in FIG. 3 is formed of a stack of two or more films 71. The spacer 70 shown in FIG. 3 may apply to the glass panel unit 10 of FIG. 1. In FIG. 3, three films 71 are used. The number of films 71 may be two or four or more. As a thickness of a polyimide film increases, physical properties may become unstable and strength or the like may become uneven. However, use of a stack may allow a decrease in a thickness of one polyimide film. Thus, even if the stack becomes thick, physical properties can be stabilized. Accordingly, it is possible to produce the spacer 70 with stable strength or the like.

A film 71 may have a thickness in a range of 1 to 50 μm, for example. When the film 71 has a thickness in this range, resistance to impact can be improved efficiently, Additionally, when the film 71 has a thickness in this range, destabilization of physical properties of resin can be suppressed and additionally it is possible to ensure a height for forming a space reserved for the evacuated space 50 efficiently. A thickness of the film 71 may be equal to or larger than 5 μm, or may be equal to or larger than 10 μm, or may be equal to or larger than 20 μm. The thicker the film 71 is, the more the film becomes suitable for ensuring the space. The thickness of the film 71 may be equal to or smaller than 45 μm, and may be equal to or smaller than 40 μm. The thinner the film 71 is, the more destabilization of resin can be suppressed. The thinner the polyimide film is, the more destabilization can be suppressed. When the thickness of the polyimide film is excessively large, there may be a probability that volatizing a solvent in production becomes not easy. This may lead to a decrease in physical properties. The polyimide film can offer advantageous effects that a coefficient of thermal expansion is small and elasticity is high.

The polyimide film can be produced by materials including aromatic diamines with the benzoxazole structures described above and aromatic tetracarboxylic acid anhydride as described above. For example, first, these materials are condensed in a solvent to obtain a polyamide acid solution. Thereafter, the polyamide acid solution is applied onto a support and then dried to form a green film which can retain its shape. After that, the green film is imidized by thermal treatment. As a result, the polyimide film can be formed. At this time, the resultant film may be stretched, but it is preferable not to stretch it. When it is not stretched, physical properties may be stabilized. It is preferable to use the non-stretched polyimide film.

When the spacer 70 includes a film 71 other than polyimide films, the film 71 other than polyimide films may be a film 71 made of appropriate material. Films other than polyimide films may be treated as additional films. All the films 71 included in the spacer 70 may be polyimide films. Alternatively, one or some of the films 71 included in the spacer 70 may be polyimide film(s) and other(s) may be additional film(s).

The additional film may preferably contain at least one material selected from glass, metal, ceramic, and graphite. The additional film may be a glass film. The additional film may be a metal film. The additional film may be a ceramic film. The additional film may be a graphite film. The glass film may be a thin glass film. Alternatively, the glass film may include glass fibers. Alternatively, the glass film may be glass woven cloth. Alternatively, the glass film may be glass non-woven cloth. The metal film may be metal foil. Alternatively, the metal film may be rolled metal. A preferable example of material of the metal film may be stainless steel (for example, SUS). Note that, aforementioned terminology "films" may be read as sheets. For example, ceramic films can be read as ceramic sheets.

The spacer 70 may have, for example, a structure where two polyimide films are positioned on opposite sides in a stacking direction of a stack and one or more additional films are positioned between the two polyimide films, According to this structure, resistance to impact can be improved. The stacking direction of the stack is equivalent to the thickness direction of the glass panel unit 10.

Two to more films 71 are bonded with each other with bond. The bond forms a bonding layer 72. Examples of the bond may include resin bond. Examples of such resin may include thermosetting resin and ultraviolet curable resin. Stacking of the films 71 can be performed before the first glass panel 20 and the second glass panel 30 are bonded. The spacer 70 may include two or more films 71 and one or more bonding layers 72. Each bonding layer 72 may be positioned between adjacent two of the films 71.

Preferable examples of bond for bonding the films 71 may include polyamide acid. Preferably, the two or more films 71 are bonded to each other with polyamide acid. The polyamide acid is excellent in adhesiveness, and has high resistance to heat. Preferably, the bonding layer 72 may be made of polyamide acid.

A bonding layer 72 may have a thickness in a range of 0.1 to 10 µm, for example. The bonding layer 72 may preferably have a thickness smaller than the thickness of the film 71. The thickness of the bonding layer 72 may be more preferably smaller than half of the thickness of the film 71, and most preferably be smaller than one-tenth of the thickness of the film 71. The thickness of the bonding layer 72 may be equal to or larger than 0.5 µm, and may be equal to or larger than 0.8 µm. The thickness of the bonding layer 72 may be equal to or smaller than 5 µm, and may be equal to or smaller than 3 µm.

The stack of the films 71 can be produced by stacking two or more films 71 while placing bond between adjacent two of the films 71 and then heating and pressing stacked films 71 (that is, a stack where the films are not bonded to each other yet). In this process, heating and pressing may be preferably performed by vacuum pressing. A heating temperature for pressing may be in a range of 300 to 500° C., for example. The pressure at pressing may be in a range of 8 to 12 MPa, for example. The time for pressing may be in a range of 5 minutes to 2 hours, for example.

The stack of the films 71 is prepared by bonding two or more films 71 with bond and is cut into a shape in accordance with a shape of the spacer 70. Thereby, a cut part of the stack can be used as the spacer 70. Cutting of the stack can be done by punching with a punch or the like. By cutting the stack into a circle, the circular spacer 70 can be produced. The stacking direction of the films 71 may be identical to the thickness direction of the glass panel unit 10.

It is preferable that an area ratio of the spacer 70 to the glass panel unit 10 in a plan view be in a range of 0.01 to 0.2%. In this case, the spacer 70 is unlikely to be perceived, and additionally strength of the glass panel unit 10 can be improved. The plan view means a view of the glass panel unit 10 in the thickness direction thereof. The thickness direction of the glass panel unit 10 is identical to the height direction of the spacer 70.

Modifications of the spacer 70 may include a spacer 70 containing at least one material selected from glass, metal, ceramic, and graphite. In this case, a function of the spacer 70 can be improved. For example, strength of the spacer 70 can be enhanced. Or, thermal conductivity of the spacer 70 can be lowered. At least one material selected from glass, metal, ceramic, and graphite may be defined as functional material here. The functional material may be included in one or more films 71 or may be included in one or more bonding layers 72, as described above. Or, the functional material may be included in a polyimide film. It is more preferable that the functional material be included in one or more bonding layers 72, In this case, it is possible to easily produce the spacer 70 including the functional material. For example, the functional material is blended into bond, and the films 71 are bonded to each other with the prepared bond. By doing so, the bonding layer 72 containing the functional material can be formed.

Hereinafter, a method for manufacturing the glass panel unit 10 is described with reference to FIG. 4 to FIG. 10. FIG. 4 to FIG. 10 show an example of the method for manufacturing the glass panel unit 10. The glass panel unit 10 shown in FIG. 1 to FIG. 3 can be produced by the method illustrated in FIG. 4 to FIG. 10. According to the method illustrated in FIG. 4 to FIG. 10, the glass panel unit 10 devoid of any outlet can be produced.

Figure 4:
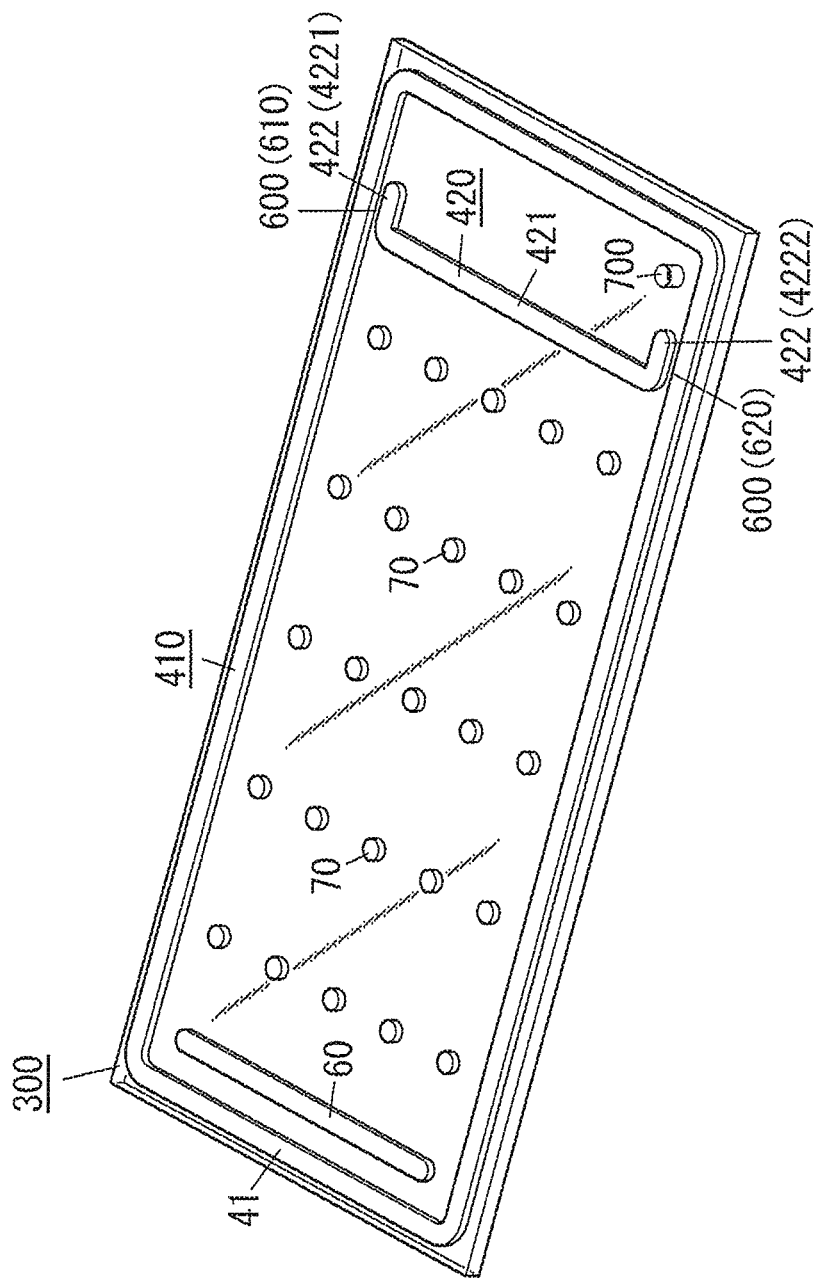
FIG. 4 is a perspective view of the glass panel unit at a step of a method for manufacturing the same thereof.
Figure 5:
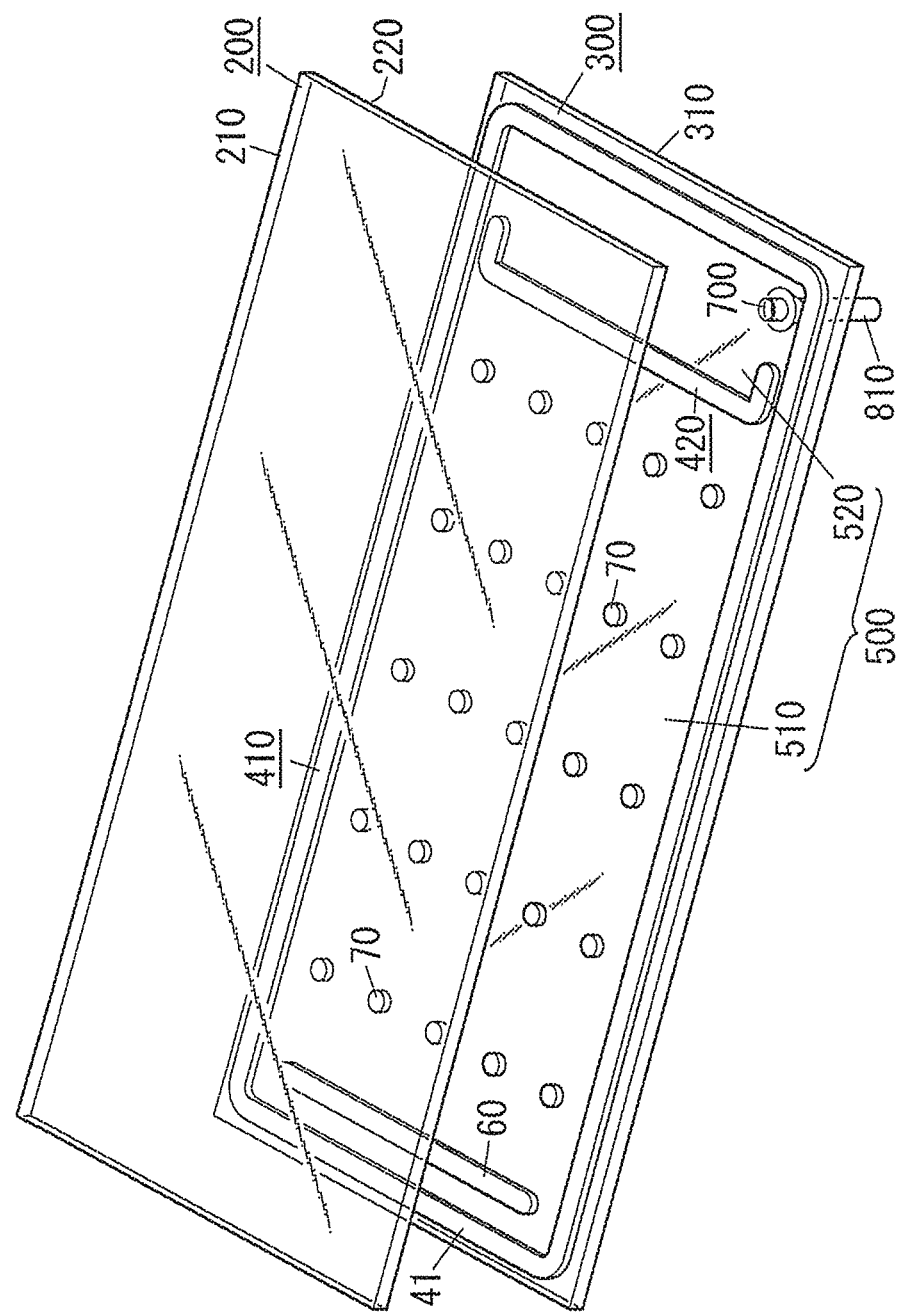
FIG. 5 is a perspective view of the glass panel unit at another step of the method for manufacturing the same.
Figure 6:
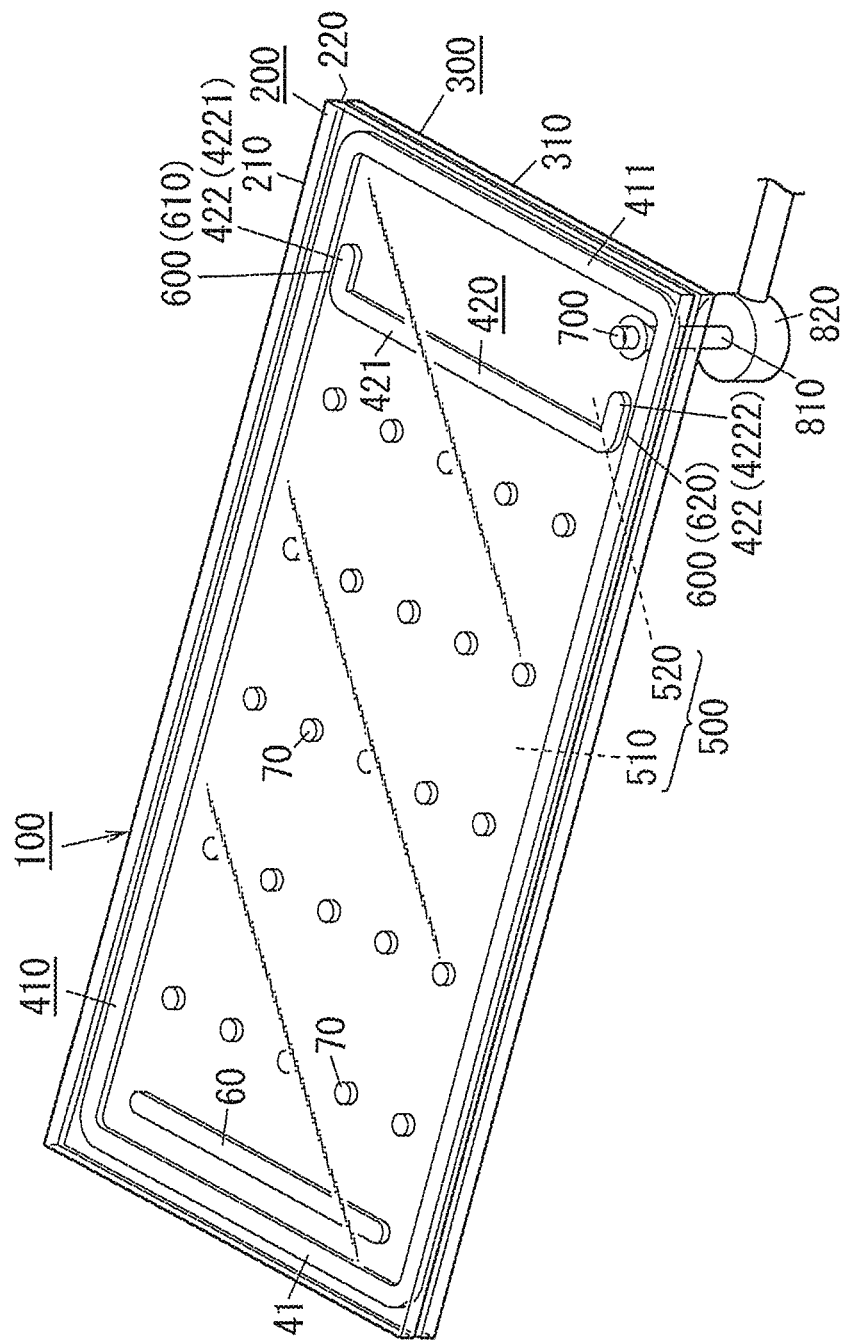
FIG. 6 is a perspective view of the glass panel unit at another step of the method for manufacturing the same.
Figure 7:
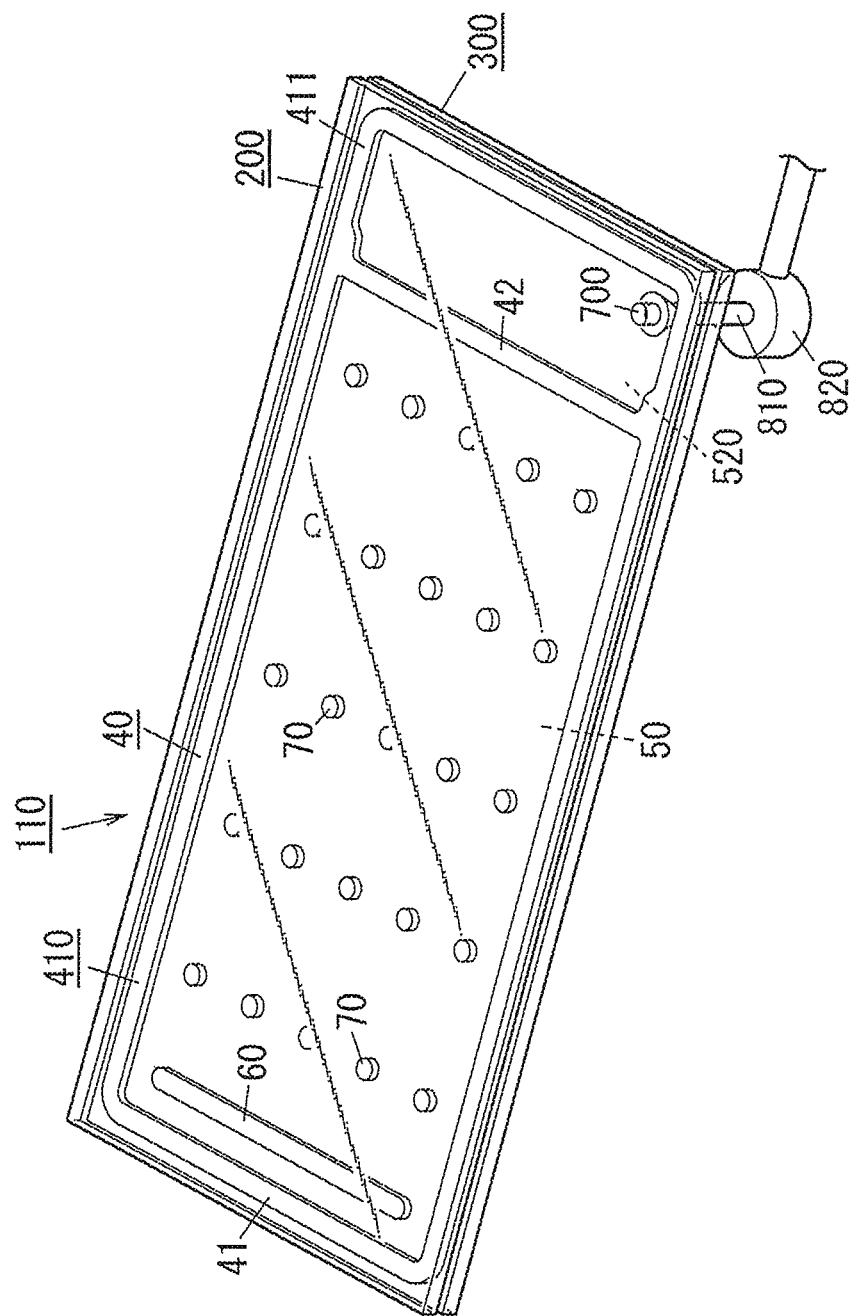
FIG. 7 is a perspective view of the glass panel unit at another step of the method for manufacturing the same.
Figure 8:
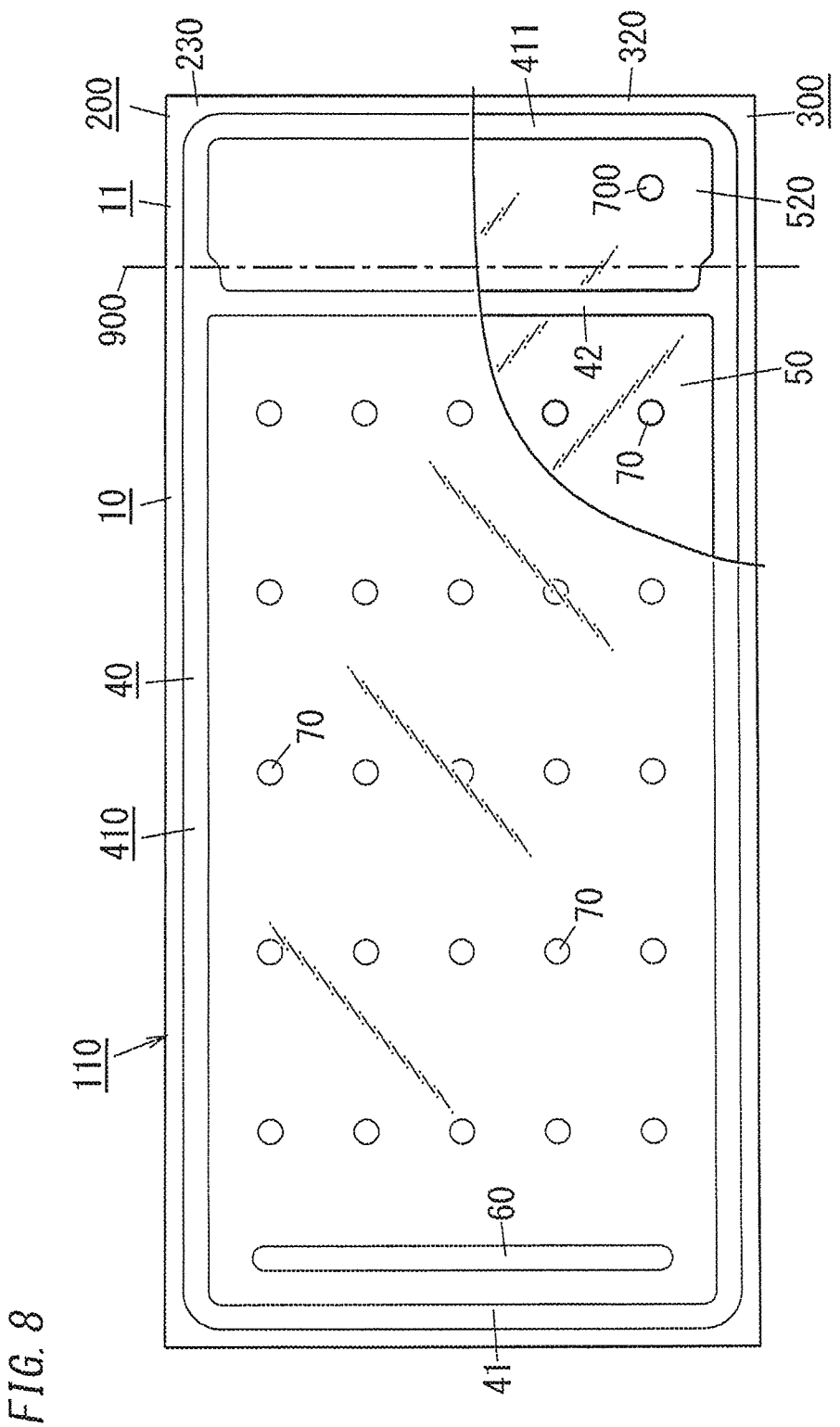
FIG. 8 is a schematic plan of a completed assembly of the glass panel unit.
Figure 9:
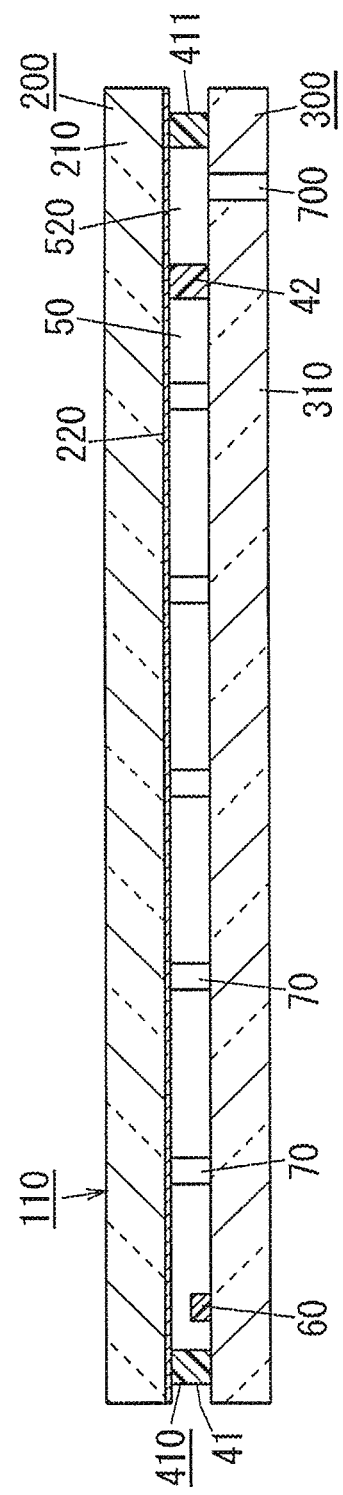
FIG. 9 is a schematic section of the completed assembly of the glass panel unit.
Figure 10:
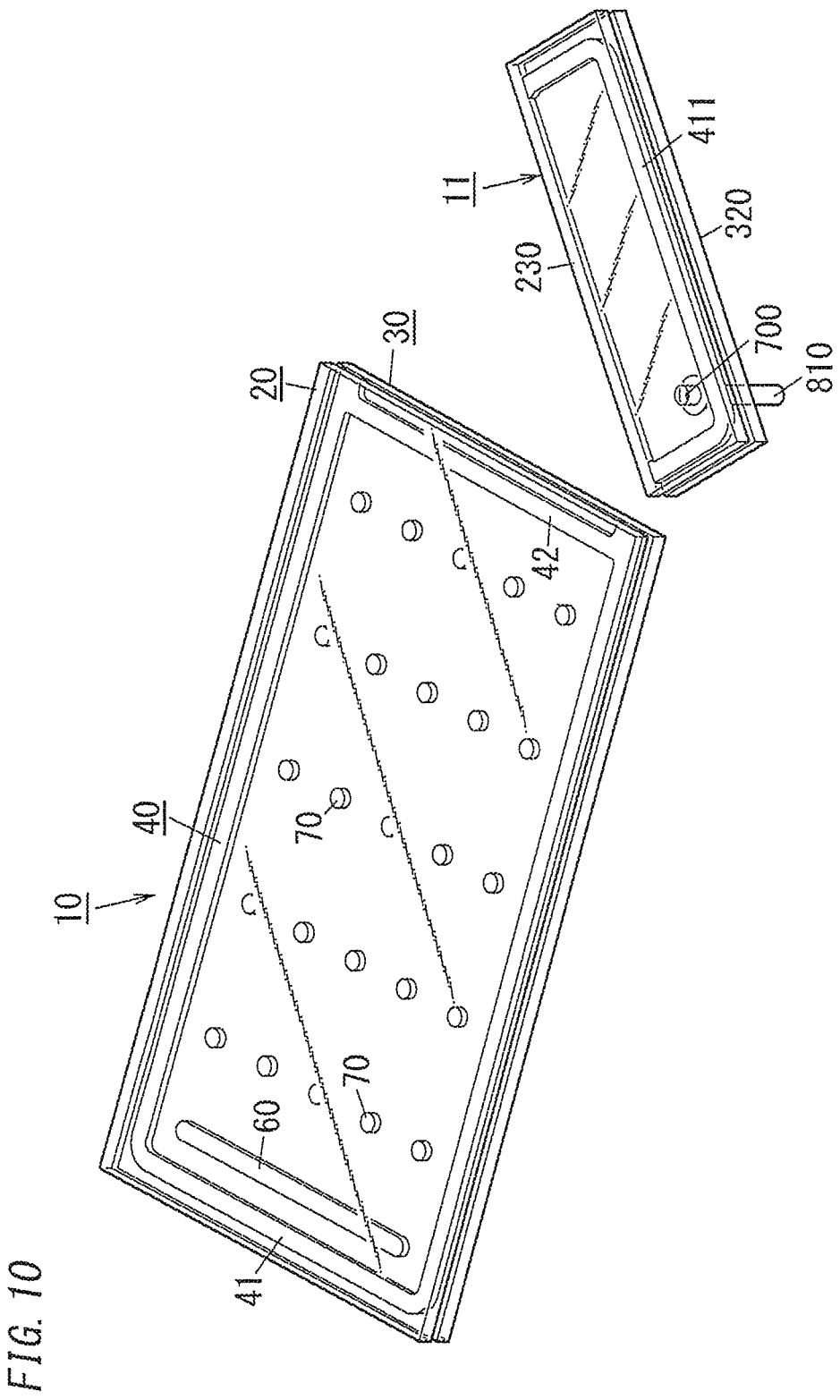
FIG. 10 is a perspective view of the glass panel unit at another step of the method for manufacturing the same.

To produce the glass panel unit 10, first of all a temporary assembly 100 is prepared as shown in FIG. 4 to FIG. 6 and subsequently a completed assembly 110 shown in FIG. 7 to FIG. 9 is prepared by a predetermined process. Thereafter, as shown in FIG. 10, the glass panel unit 10 can be obtained by cutting a particular part from the completed assembly 110.

The method for manufacturing the glass panel unit 10 includes a preparation step, an assembling step, a hermetically enclosing step, and a removing step. Note that, the preparation step can be omitted.

The preparation step is a step of preparing a first glass substrate 200, a second glass substrate 300, a frame 410, a partition 420, the gas adsorbent 60, and the multiple spacers 70, According to the preparation step, an inside space 500, a gas passage 600, and an outlet 700 can be formed.

The first glass substrate 200 is a substrate to give the first glass panel 20, As shown in FIG. 9, the first glass substrate 200 includes a glass plate 210 determining a plan shape of the first glass substrate 200, and a coating 220, The glass plate 210 is a rectangular flat plate and includes a first face and a second face in a thickness direction which are parallel to each other. The coating 220 is formed on the second face of the glass plate 210. The glass plate 210 forms the body 21 of the first glass panel 20. The first face of the glass plate 210 corresponds to the first face of the body 21, and the second face of the glass plate 210 corresponds to the second face of the body 21. The coating 220 forms the coating 22 of the first glass panel 20, Note that, the coating 220 may be optional.

The second glass substrate 300 is a substrate to give the second glass panel 30. As shown in FIG. 9, the second glass substrate 300 includes a glass plate 310 determining a plan shape of the second glass substrate 300. The glass plate 310 is a rectangular flat plate and includes a first face and a second face in a thickness direction which are parallel to each other. The second glass substrate 300 serves as a base for the body 31 of the second glass panel 30. The first face of the glass plate 310 corresponds to the first face of the body 31, and the second face of the glass plate 310 corresponds to the second face of the body 31. The glass plate 310 has the same plan shape and plan size as the glass plate 210, In other words, the second glass substrate 300 has the same plan shape as the first glass substrate 200. Further, the glass plate 310 has the same thickness as the glass plate 210. The second glass substrate 300 includes the glass plate 310 only. In other words, the glass plate 310 forms the second glass substrate 300 by itself.

The second glass substrate 300 is placed opposite the first glass substrate 200. In more detail, the first glass substrate 200 and the second glass substrate 300 are arranged so that the second face of the glass plate 210 and the first face of the glass plate 310 face and parallel to each other.

The frame 410 is placed between the first glass substrate 200 and the second glass substrate 300 to hermetically bond the first glass substrate 200 and the second glass substrate 300 to each other. Thereby, as shown in FIG. 6, the inside space 500 enclosed by the frame 410, the first glass substrate 200, and the second glass substrate 300 is formed.

The frame 410 is formed of thermal adhesive (the first thermal adhesive with the first softening point). Examples of the first thermal adhesive may include glass frit. Examples of the glass frit may include low-melting-point glass frit. Examples of the low-melting-point glass frit may include bismuth-based glass frit, lead-based glass frit, and vanadium-based glass frit.

The frame 410 has a rectangular frame shape. The frame 410 has the same plan shape as each of the glass plates 210 and 310, but the frame 410 has a smaller plan size than each of the glass plates 210 and 310. As shown in FIG. 4, the frame 410 is formed to extend along an outer periphery of the second glass substrate 300. In other words, the frame 410 is formed to cover an almost entire region on the second glass substrate 300.

The partition 420 is placed inside the inside space 500. As shown in FIG. 6, the partition 420 divides the inside space 500 into an evacuation space 510 and a gas passage space 520. The evacuation space 510 is a space to be evacuated later, and the gas passage space 520 is a space used for evacuating the evacuation space 510. The partition 420 is formed between a first end (right end in FIG. 4) and a center of the second glass substrate 300 in a lengthwise direction (left and right direction in FIG. 4) of the second glass substrate 300 so that the evacuation space 510 is larger than the gas passage space 520.

The partition 420 includes a wall part 421 and a pair of closing parts 422 (a first closing part 4221 and a second closing part 4222). The wall part 421 is formed to extend along a width direction of the second glass substrate 300. In FIG. 6, the width direction means a direction extending along a short side of the temporary assembly 100 with a rectangular shape. Note that, the wall part 421 has opposite ends in a lengthwise direction not in contact with the frame 410, The pair of closing parts 422 extends from the opposite ends in the lengthwise direction of the wall part 421 toward the first end in the lengthwise direction of the second glass substrate 300.

The partition 420 is formed of thermal adhesive (the second thermal adhesive with the second softening point). Examples of the second thermal adhesive may include glass frit. Examples of the glass frit may include low-melting-point glass frit. Examples of the low-melting-point glass frit may include bismuth-based glass frit, lead-based glass frit, and vanadium-based glass frit. The second thermal adhesive is same as the first thermal adhesive, and the second softening point is equal to the first softening point.

The gas adsorbent 60 is placed inside the evacuation space 510. In more detail, the gas adsorbent 60 is placed on one end of the evacuation space 510, Further, the gas adsorbent 60 is positioned away from the partition 420 and the gas passage 600. Hence, it is possible to lower a probability that the gas adsorbent 60 prevents evacuation of the evacuation space 510.

The multiple spacers 70 are already described with reference to FIG. 1, FIG. 2, and FIG. 3. Each spacer 70 may be preferably formed of the stack of films 71 shown in FIG. 3. The spacer 70 can be produced by bonding, with bond, two or more films 71 including at least one polyimide film and then cutting the bonded films. The preparation step may further include a step of preparing spacers 70. As shown in FIG. 4, the multiple spacers 70 may be arranged at predetermined intervals in longitudinal and lateral directions.

Note that, a height of the spacer 70 which is present as a separate part before included in the glass panel unit 10 may be different from a height of the spacer 70 after the glass panel unit 10 has been formed. The spacers 70 may be compressed in the height direction due to being sandwiched by the two glass panels. When the spacer 70 contains the polyimide having the benzoxazole structures, strength of the spacer 70 can be increased and therefore excess compression of the spacer 70 can be suppressed. Therefore, it is possible to ensure the thickness of the evacuated space 50 easily. Additionally, strength of the glass panel unit 10 can be increased. Further, crush of the spacer 70 can be suppressed, and the glass panel unit 10 cart have good appearance (aesthetic properties).

The gas passage 600 interconnects the evacuation space 510 and the gas passage space 520 in the inside space 500. The gas passage 600 includes a first gas passage 610 and a second gas passage 620. The first gas passage 610 is a space formed between the first closing part 4221 and part of the frame 410 facing the first closing part 4221. The second gas passage 620 is a space formed between the second closing part 4222 and part of the frame 410 facing the second closing part 4222, As a result of placing the partition 420 as described above, the gas passage 600 is formed.

The outlet 700 is a hole interconnecting the gas passage space 520 and an outside space. The outlet 700 is used for evacuating the evacuation space 510 by way of the gas passage space 520 and the gas passage 600. Therefore, the gas passage 600, the gas passage space 520, and the outlet 700 constitute an evacuation passage for evacuating the evacuation space 510. The outlet 700 is formed in the second glass substrate 300 to interconnect the gas passage space 520 and the outside space. In more detail, the outlet 700 is positioned in a corner of the second glass substrate 300.

The preparation step is performed for the aforementioned members. The preparation step includes first to sixth steps. Note that, the order of the second to sixth steps may be modified.

The first step is a step (substrate formation step) of forming the first glass substrate 200 and the second glass substrate 300, For example, in the first step, the first glass substrate 200 and the second glass substrate 300 are produced. The first step may include cleaning the first glass substrate 200 and the second glass substrate 300 if necessary.

The second step is a step of forming the outlet 700. In the second step, the outlet 700 is formed in the second glass substrate 300, Further, in the second step, the second glass substrate 300 is cleaned if necessary. Note that, the outlet 700 may be formed in the first glass substrate 200.

The third step is a step (sealing material formation step) of forming the frame 410 and the partition 420. In the third step, the material (the first thermal adhesive) of the frame 410 and the material (the second thermal adhesive) of the partition 420 are applied on to the second glass substrate 300 (the first face of the glass plate 310) with a dispenser or the like. Thereafter, the material of the frame 410 and the material of the partition 420 are dried and calcined. For example, the second glass substrate 300 where the material of the frame 410 and the material of the partition 420 are applied is heated at 480° C. for 20 minutes. Note that, the first glass substrate 200 may be heated together with the second glass substrate 300. In other words, the first glass substrate 200 may be heated under the same condition (at 480° C. for 20 minutes) as the second glass substrate 300. By doing so, it is possible to reduce a difference in degree of warp between the first glass substrate 200 and the second glass substrate 300.

The fourth step is a step (spacer placement step) of placing the spacers 70. The fourth step may include placing the multiple spacers 70 in individual predetermined locations on the second glass substrate 300 with a chip mounter. Note that, the multiple spacers 70 are formed in advance. Alternatively, the multiple spacers 70 may be formed by use of known thin film formation techniques. For example, the spacers 70 can be formed by applying polyimide or compositions for forming polyimide, onto the second glass substrate 300.

The fifth step is a step (gas adsorbent formation step) of forming the gas adsorbent 60. In the fifth step, a solution where a power of the getter is dispersed is applied to a predetermined location on the second glass substrate 300 and then dried to thereby form the gas adsorbent 60.

When a process from the first step to the fifth step is completed, the second glass substrate 300 is obtained, on which the frame 410, the partition 420, the gas passage 600, the outlet 700, the gas adsorbent 60, and the multiple spacers 70 are formed as shown in FIG. 4.

The sixth step is a step (placing step) of placing the first glass substrate 200 and the second glass substrate 300. In the sixth step, the first glass substrate 200 and the second glass substrate 300 are placed so that the second face of the glass plate 210 and the first face of the glass plate 310 face and are parallel to each other. FIG. 5 shows a step of placing the first glass substrate 200 on the second glass substrate 300. Note that, in the present example, members (for example, the frame 410 and the partition 420) are placed on the second glass substrate 300. Alternatively, such members may be placed on the first glass substrate 200.

The assembling step is a step of preparing the temporary assembly 100. In more detail, in the assembling step, the temporary assembly 100 is prepared by bonding the first glass substrate 200 and the second glass substrate 300 to each other. In other words, the assembling step may be referred to as a step (first melting step) of hermetically bonding the first glass substrate 200 and the second glass substrate 300 to each other with the frame 410.

In the first inciting step, the first thermal adhesive is melted once at the predetermined temperature (the first melting temperature) equal to or higher than the first softening point and thereby the first glass substrate 200 and the second glass substrate 300 are hermetically bonded to each other. The first glass substrate 200 and the second glass substrate 300 are hermetically bonded to each other with the frame 410, In more detail, the first glass substrate 200 and the second glass substrate 300 are placed in a furnace and heated at the first melting temperature only for predetermined time (the first melting time).

The first melting temperature and the first melting time are selected so that the first glass substrate 200 and the second glass substrate 300 are hermetically bonded to each other with the thermal adhesive of the frame 410 but the gas passage 600 is not closed by the partition 420. In other words, a lower limit of the first melting temperature is equal to the first softening point, and an upper limit of the first melting temperature is however selected so as not to cause the partition 420 to close the gas passage 600. For example, when the first softening point and the second softening point are 434° C., the first inciting temperature is set to 440° C. Further, the first melting time may be 10 minutes, for example. Note that, in the first melting step, the frame 410 may emit gas. However such gas may be adsorbed by the gas adsorbent 60.

Through the aforementioned assembling step (the first melting step), the temporary assembly 100 shown in FIG. 6 can be produced. The temporary assembly 100 includes the first glass substrate 200, the second glass substrate 300, the frame 410, the inside space 500, the partition 420, the gas passage 600, the outlet 700, the gas adsorbent 60, and the multiple spacers 70.

The hermetically enclosing step is a step of subjecting the temporary assembly 100 to the above predetermined process to obtain the completed assembly 110. The hermetically enclosing step includes the evacuating step and a melting step (the second melting step). In other words, the evacuating step and the second melting step constitute the above predetermined process.

The evacuating step is a step of converting the evacuation space 510 into the evacuated space 50 by evacuating it by way of the gas passage 600, the gas passage space 520, and the outlet 700 at the predetermined temperature (the evacuating temperature), Like this, heating may be preferably conducted in the evacuating step. This may lead to an increase in the degree of vacuum.

Evacuation can be done by a vacuum pump, for example. As shown in FIG. 6, the vacuum pump is connected to the temporary assembly 100 with the evacuation pipe 810 and a sealing head 820. The evacuation pipe 810 is bonded to the second glass substrate 300 so that an inside of the evacuation pipe 810 is connected to the outlet 700, for example. The sealing head 820 is attached to the evacuation pipe 810, and thereby an inlet of the vacuum pump is connected to the outlet 700.

The first melting step, the evacuating step, and the second melting step are performed with the first glass substrate 200 and the second glass substrate 300 being left in the furnace. In this regard, the frame 410, the partition 420, the gas passage 600, the outlet 700, the gas adsorbent 60, and the multiple spacers 70 are already provided to the second glass substrate 300, Therefore, an evacuation pipe 810 is bonded to the second glass substrate 300 before the first melting step at the latest.

In the evacuating step, the evacuation space 510 is evacuated by way of the gas passage 600, the gas passage space 520, and the outlet 700 at a predetermined evacuating temperature only for predetermined time (evacuation time). The evacuating temperature is set to be higher than the activation temperature (for example, 350° C.) of the getter of the gas adsorbent 60, and also is set to be lower than the first softening point and the second softening point (for example, 434° C.). The evacuating temperature may be preferably equal to or higher than 300° C. For example, the evacuating temperature is 390° C. According to the above settings, deformation of the frame 410 and the partition 420 is unlikely to occur. Further, the getter of the gas adsorbent 60 is activated, and thus molecules (gas) adsorbed on the getter are desorb d from the getter. Such molecules (that is, gas) desorbed from the getter are discarded through the evacuation space 510, the gas passage 600, the gas passage space 520, and the outlet 700. Therefore, in the evacuating step, the adsorbability of the gas adsorbent 60 is recovered. The evacuation tune is set to obtain the evacuated space 50 having a desired degree of vacuum (for example, a degree of vacuum equal to or lower than 0.1 Pa). For example, the evacuation time is set to 120 minutes.

The second melting step is a step of forming the seal 40 enclosing the evacuated space 50 by changing the shape of the partition 420 to form the separator 42 closing the gas passage 600. In the second melting step, the second thermal adhesive is melted once at the predetermined temperature (the second melting temperature) equal to or higher than the second softening point, and thereby the partition 420 is changed in shape to form the separator 42. In more detail, the first glass substrate 200 and the second glass substrate 300 are heated at the second melting temperature for the predetermined time (the second melting time) furnace.

The second inciting temperature and the second melting time are set to allow the second thermal adhesive to soften to form the separator 42 closing the gas passage 600. A lower limit of the second melting temperature is equal to the second softening point (434° C.). Note that, differently from the first melting step, the purpose of the second melting step is to change the shape of the partition 420, and consequently the second melting temperature is set to be higher than the first melting temperature (440° C.), For example, the second melting temperature is set to 460° C. Additionally, the second melting time is, for example, 30 minutes.

When the separator 42 is formed, the evacuated space 50 is separated from the gas passage space 520. Hence, the vacuum pump cannot evacuate the evacuated space 50. The frame 410 and the separator 42 are heated until the second melting step is finished, and therefore gas may be emitted from the frame 410 and the separator 42. However, gas emitted from the frame 410 and the separator 42 is adsorbed on the gas adsorbent 60 inside the evacuated space 50. Consequently, a decrease in the degree of vacuum of the evacuated space 50 can be suppressed. In summary, it is possible to suppress a decrease in the thermal insulating properties of the glass panel unit 10.

Also in the first melting step, the frame 410 and the separator 42 are heated. Thus, the frame 410 and the separator 42 may emit gas. Gas emitted by the frame 410 and the separator 42 is adsorbed by the gas adsorbent 60, and therefore the adsorbability of the gas adsorbent 60 may decrease due to the first melting step. However, in the evacuating step, the evacuation space 510 is evacuated at the evacuating temperature equal to or higher than the activation temperature of the getter of the gas adsorbent 60 and thereby the adsorbability of the gas adsorbent 60 is recovered. Therefore, the gas adsorbent 60 can adsorb a sufficient amount of gas emitted from the frame 410 and the separator 42 in the second melting step. In other words, it is possible to avoid an undesired situation the gas adsorbent 60 fails to adsorb a sufficient amount of gas emitted from the frame 410 and the separator 42 and thus the degree of vacuum of the evacuated space 50 decreases.

Additionally, in the second melting step, evacuation of the evacuation space 510 through the gas passage 600, the gas passage space 520, and the outlet 700 is continued from the evacuating step. In other words, in the second melting step, the separator 42 closing the gas passage 600 is formed by changing the shape of the partition 420 at the second melting temperature while the evacuation space 510 is evacuated through the gas passage 600, the gas passage space 520, and the outlet 700. By doing so, it is possible to further lower a probability that the degree of vacuum of the evacuated space 50 decreases during the second melting step. Note that, the second melting step does not necessarily include evacuating the evacuation space 510 through the gas passage 600, the gas passage space 520, and the outlet 700.

The above predetermined process includes converting the evacuation space 510 into the evacuated space 50 by evacuating the evacuation space 510 by way of the gas passage 600, the gas passage space 520, and the outlet 700 at a predetermined temperature (evacuating temperature). The evacuating temperature is higher than the activation temperature of the getter of the gas adsorbent 60. Consequently, evacuation of the evacuation space 510 and recovery of the adsorbability of the getter can be performed simultaneously.

The above predetermined process further includes forming the seal 40 enclosing the evacuated space 50 by forming a separator 42 for closing the gas passage 600 by changing a shape of the partition 420 (see FIG. 8). The partition 420 includes the second thermal adhesive. Therefore, the separator 42 can be formed by changing the shape of the partition 420 by once melting the second thermal adhesive at a predetermined temperature (second melting temperature) equal to or higher than the second softening point. Note that, the first melting temperature is lower than the second inciting temperature, Consequently, it is possible to prevent the gas passage 600 from being closed due to deformation of the partition 420 in bonding the first glass substrate 200 and the second glass substrate 300 with the frame 410. Note that, the partition 420 may be made of material which is more deformable than that of the frame 410 when melted.

The partition 420 is changed in shape so that the first closing part 4221 closes the first gas passage 610 and the second closing part 4222 closes the second gas passage 620. The separator 42, which is obtained by changing the shape of the partition 420 as described above, separates (spatially) the evacuated space 50 from the gas passage space 520, The separator (second part) 42 and part (first part) 41 of the frame 410 corresponding to the evacuated space 50 constitute the seal 40 enclosing the evacuated space 50.

The evacuated space 50 is obtained by evacuating the evacuation space 510 by way of the gas passage space 520 and the outlet 700 as described above. The evacuated space 50 is hermetically enclosed by the first glass substrate 200, the second glass substrate 300, and the seal 40 completely and thus is separated from the gas passage space 520 and the outlet 700.

Additionally, the seal 40 with a rectangular frame shape is formed. The seal 40 includes the first part 41 and the second part 42. The first part 41 is part of the frame 410 corresponding to the evacuated space 50. In other words, the first part 41 is part of the frame 410 facing the evacuated space 50. The first part 41 has an almost U-shape, and serves as three of four sides of the seal 40. The second part 42 is a separator formed by changing the shape of the partition 420. The second part 42 has an I-shape, and serves as a remaining one of the four sides of the seal 40.

In the evacuating step, forces may arise to move the first glass substrate 200 and the second glass substrate 300 close to each other. However, the spacers 70 keep the space between the first glass substrate 200 and the second glass substrate 300.

Notably, the spacers 70 containing the polyimide having the benzoxazole structures are used, and therefore it is possible to easily ensure the thickness of the evacuated space 50 compared with a case of using spacers other than the spacers 70 containing the polyimide having the benzoxazole structures. The reason is that the polyimide having the benzoxazole structures has high thermal resistance and high strength. When polymer other than polyimide is used or polyimide not having any benzoxazole structure is used, crush of spacers are likely to occur. When such crush occurs, the thickness of the evacuated space may decrease. Further, crush may increase a probability of a decrease in the thermal insulating properties. Further, crush of spacers may result in a decrease in strength. Furthermore, crush of spacers may make the glass panel unit have poor appearance.

Through the aforementioned hermetically enclosing step, the completed assembly 110 shown in FIG. 7 to FIG. 9 is produced. The completed assembly 110 includes the first glass substrate 200, the second glass substrate 300, the seal 40, the evacuated space 50, the gas passage space 520, the gas adsorbent 60, and the multiple spacers 70. Note that, in FIG. 8, to facilitate understanding of the internal structure only, the first glass substrate 200 is illustrated with part (right and lower part) thereof being cutaway.

The removing step is a step of obtaining the glass panel unit 10 which is part including the evacuated space 50, by removing part 11 including the gas passage space 520 from the completed assembly 110. As shown in FIG. 8, in more detail, the completed assembly 110 taken out from the furnace is cut along the cutting line 900, and thereby is divided into predetermined part (glass panel unit) 10 including the evacuated space 50 and part (unnecessary part) 11 including the gas passage space 520. The unnecessary part 11 mainly includes part 230 of the first glass substrate 200 corresponding to the gas passage space 520, part 320 of the second glass substrate 300 corresponding to the gas passage space 520, and part 411 of the frame 410 corresponding to the gas passage space 520. Note that, in consideration of production cost of the glass panel unit 10, the unnecessary part 11 is preferably as small as possible, FIG. 10 shows removing the unnecessary part 11 from the completed assembly 110.

Cutting is done by an appropriate cutting device, Examples of the cutting device may include a scriber and a laser. By cutting the first glass substrate 200 and the second glass substrate 300 at the same time, the glass panel unit 10 can be cut efficiently. Note that, the shape of the cutting line 900 is set according to the shape of the glass panel unit 10. The glass panel unit 10 is rectangular, and therefore the cutting line 900 is a straight line along the lengthwise direction of the wall 42.

Through the aforementioned preparation step, assembling step, hermetically enclosing step, and removing step, the glass panel unit 10 as shown in FIG. 1 and FIG. 2 is produced. The first glass panel 20 is part of the first glass substrate 200 corresponding to the evacuated space 50. The second glass panel 30 is part of the second glass substrate 300 corresponding to the evacuated space 50. The outlet 700 for forming the evacuated space 50 is present in the part 320 of the second glass substrate 300 corresponding to the gas passage space 520, and the evacuation pipe 810 is connected to the part 320. Therefore, the outlet 700 is not present in the second glass panel 30.

Hereinafter, optional modifications relating to the glass panel unit are described. In the description relating to the modifications, the reference sings in parentheses of corresponding components are introduced.

In the above embodiment, the glass panel unit (10) is rectangular, but the glass panel unit (10) may have a desired shape such as a circular shape and a polygonal shape. Stated differently, each of the first glass panel (20), the second glass panel (30), and the seal (40) does not need to be rectangular and may have a desired shape such as a circular shape and a polygonal shape. Note that, the shapes of the first glass substrate (200), the second glass substrate (300), the frame (410), and, the separator (42) are not limited to the shapes described in the explanation of the above embodiment, and may have such shapes that the glass panel unit (10) can have a desired shape. Note that, the shape and size of the glass panel unit (10) may be determined in consideration of application of the glass panel unit (10).

Additionally, the first face and the second face, of the body (21) of the first glass panel (20) are not limited to flat faces. Similarly, the first face and the second face, of the body (31) of the second glass panel (30) are not limited to flat faces.

Additionally, the body (21) of the first glass panel (20) and the body (31) of the second glass panel (30) do not need to have the same plan shape and plan size. Further, the body (21) and the body (31) do not need to have the same thickness. Furthermore, the body (21) and the body (31) do not need to be made of the same material. Similarly, the glass plate (210) of the first glass substrate (200) and the glass plate (310) of the second glass substrate (300) do not need to have the same plan shape and plan size. Further, the glass plate (210) and the glass plate (310) do not need to have the same thickness. Furthermore, the glass plate (210) and the glass plate (310) do not need to be made of the same material.

Additionally, the seal (40) do not need to have the same plan shape with the first glass panel (20) and the second glass panel (30). Similarly, the frame (410) do not need to have the same plan shape with the first glass substrate (200) and the second glass substrate (300).

Additionally, the first glass panel (20) may include a coating which has desired physical properties and is formed on the second flat face of the body (21). Alternatively, the first glass panel (20) does not need to include the coating (22). In other words, the first glass panel (20) may be constituted by the body (21) only.

Additionally, the second glass panel (30) may include a coating with desired physical properties. For example, the coating may include at least one of thin films formed on the first flat face and the second flat face of the body (31) respectively. Examples of the coating may include a film reflective for light with a specified wavelength (for example, infrared reflective film and ultraviolet reflective film).

In the above embodiment, the frame (410) is made of the first thermal adhesive. However, the frame (410) may include other component such as a core, in addition to the first thermal adhesive. Stated differently, it is sufficient that the frame (410) includes the first thermal adhesive. In the above embodiment, the frame (410) is formed to surround an almost entire region on the second glass substrate (300). However, it is sufficient that the frame (410) is formed to surround a predetermined region on the second glass substrate (300). In other words, there is no need to form the frame (410) so as to surround an almost entire region on the second glass substrate (300). Alternatively, the completed assembly (110) may include two or more frames (410). In other words, the completed assembly (110) may include two or more inside spaces (500). In this case, it is possible to produce two or more glass panel units (10) from one completed assembly (110).

In the above embodiment, the partition (420) is made of the second thermal adhesive. However, the partition (420) may include other component such as a core, in addition to the second thermal adhesive. Stated differently, it is sufficient that the partition (420) includes the second thermal adhesive. Further, in the above embodiment, the partition (420) has its opposite end not connected to the frame (410). And, gaps between the opposite ends of the partition (420) and the frame (410) define the gas passages (610, 620). However, the partition (420) may have only one of its opposite ends not connected to the frame (410). In this case, there is one gas passage (600) between the partition (420) and the frame (410). Alternatively, the partition (420) may have its opposite end both connected to the frame (410). In this case, the gas passage (600) may be a through hole formed in the partition (420). Alternatively, the gas passage (600) may be a gap between the partition (420) and the first glass substrate (200), Alternatively, the partition (420) may be defined as a set of two or more partitions spaced from each other. In this case, the gas passage (600) may be a gap between adjacent two of the two or more partitions.

In the above embodiment, the inside space (500) is divided into one evacuation space (510) and one gas passage space (520). Note that, the inside space (500) may be divided into one or more evacuation spaces (510) and one or more gas passage spaces (520). When the inside space (500) includes two or more evacuation spaces (510), it is possible to produce two or more glass panel units (10) from one completed assembly (110).

In the above embodiment, the second thermal adhesive is identical to the first thermal adhesive, and the second softening point is equal to the first softening point. However, the second thermal adhesive may be different material from the first thermal adhesive. For example, the second thermal adhesive may have the second softening point different from the first softening point of the first thermal adhesive. In such a case, the second softening point may be preferably higher than the first softening point. In this case, the first melting temperature can be set to be equal to or higher than the first softening point and lower than the second softening point. By doing so, it is possible to suppress undesired deformation of the partition 420 in the first melting step.

Additionally, each of the first thermal adhesive and the second thermal adhesive are not limited to glass frit, and may be selected from low-melting-point metal, hot-melt adhesive, and the like, for example.

In the above embodiment, a furnace is used to heat the frame (410), the as adsorbent (60), and the partition (420). However, such heating can be done with appropriate heating means. Examples of the heating means may include a laser and a thermally conductive plate connected to a heat source.

In the above embodiment, the gas passage (600) includes the two gas passages (610, 620). However, the gas passage (600) may include only one gas passage or may include three or more gas passages. Further, the shape of the gas passage (600) are not limited in particular.

In the above embodiment, the outlet (700) is formed in the second glass substrate (300). However, the outlet (700) may be formed in the glass plate (210) of the first glass substrate (200) or may be formed in the frame (410). In summary, the outlet (700) may be allowed to be formed in the unnecessary part (11).

In the above embodiment, the getter of the gas adsorbent (60) is an evaporative getter. However, the getter may be a non-evaporative getter. When the non-evaporative getter has a temperature equal to or higher than a predetermined temperature (the activation temperature), adsorbed molecules intrudes into an inside of the getter, and thus the adsorbability can be recovered, in contrast to the evaporative getter, the adsorbed molecules are not desorbed. Therefore, after the non-evaporative getter has adsorbed an amount of molecules equal to or more than a certain amount, the adsorbability is no longer recovered even if the getter is heated up to a temperature equal to or higher than the activation temperature.

In the above embodiment, the gas adsorbent (60) has an elongated shape, but may have another shape. Additionally, the gas adsorbent (60) does not necessarily need to be positioned at the end of the evacuated space (50). Further, in the above embodiment, the gas adsorbent (60) may be formed by applying a liquid containing a powder of the getter (for example, a dispersion liquid prepared by dispersing a powder of the getter in a liquid, and a solution prepared by dissolving a powder of the getter in a liquid). However, the gas adsorbent (60) may include a substrate and the getter fixed to the substrate. This type of the gas adsorbent (60) may be formed by immersing a substrate in a liquid containing the getter and drying it. Note that, the substrate may have a desired shape, but may be an elongated rectangular shape, for example.

Alternatively, the gas adsorbent (60) may be a film formed entirely or partially on the surface (first face) of the glass plate (310) of the second glass substrate (300). This type of the gas adsorbent (60) may be formed by coating the surface (first face) of the glass plate (310) of the second glass substrate (300) with a liquid containing a powder of the getter.

Alternatively, the gas adsorbent (60) may be included in the spacer (70). For example, the spacer (70) may be made of material containing the getter, and thereby the spacer (70) including the gas adsorbent (60) can be obtained. For example, the bonding layer (72) may include the getter.

Alternatively, the gas adsorbent (60) may be solid material made of the getter. This gas adsorbent (60) tends to have a large size, and thus cannot be placed between the first glass substrate (200) and the second glass substrate (300) in some cases. In such cases, the glass plate (310) of the second glass substrate (300) may be formed to include a recess, and the gas adsorbent (60) may be placed in this recess.

Alternatively, the gas adsorbent (60) may be preliminarily placed in a package to suppress the getter from adsorbing molecules. In this case, the package may be broken after the second melting step to expose the gas adsorbent (60) to the evacuated space (50).

In the above embodiment, the glass panel unit (10) includes the gas adsorbent (60). However, the glass panel unit (10) does not need to include any gas adsorbent (60).

In the above embodiment, the glass panel unit (10) includes the multiple spacers (70). However, the glass panel unit (10) may include a single spacer (70).

In the above embodiment, the spacer (70) contains the polyimide having the benzoxazole structures. However, the spacer (70) may contain not the polyimide having the benzoxazole structures but polymer having a viscoelastic coefficient at 400° C. which is larger than 500 MPa. Also in this case, glass panel unit (10) with increased strength can be obtained, Polymer contained in the spacer (70) may have a viscoelastic coefficient at 400° C. which is smaller than $1 \times 10^6$ MPa. As for the polymer, a viscoelastic coefficient at 400° C. may be preferably larger than 1000 MPa, more preferably 1500 MPa, and most preferably 2000 MPa. The spacer (70) may be formed of a stack of films of the above polymer. Alternatively, the spacer (70) may contain not the polyimide having the benzoxazole structures but polymer having a ratio (V400/V20) of a viscoelastic coefficient V400 at 400° C. to a viscoelastic coefficient V20 at 20° C. which is equal to or larger than 0.1. This ratio (V400/V20) may be preferably equal to or larger than 0.2, more preferably 0.3, and most preferably 0.4. Alternatively, the spacer (70) may contain not the polyimide having the benzoxazole structures but polymer having a coefficient of thermal expansion at 400° C. which is smaller than 10 ppm/° C., Also in this case, the glass panel unit (10) with increased strength can be obtained, Polymer contained in the spacer (70) may have a coefficient of thermal expansion at 400° C. which is larger than 0.1 ppm/° C. Alternatively, the spacer (70) may contain not the polyimide having the benzoxazole structures but polymer which has a viscoelastic coefficient at 400° C. larger than 500 MPa and a coefficient of thermal expansion at 400° C. smaller than 10 ppm/° C.

The present embodiment relates to forming the glass panel unit (10) not including an outlet by removing the unnecessary part (11). In one case, the glass panel unit (10) may include an outlet. In this case, at least one of the first glass panel (20) and the second glass panel (30) may include an outlet. The outlet is closed to keep the evacuated space (50) in the vacuum state. When at least one of the first glass panel (20) and the second glass panel (30) includes such an outlet, the outlet may be closed with a cap. However, to improve an appearance, it is preferable that the glass panel unit (10) do not include the outlet.

Figure 11:
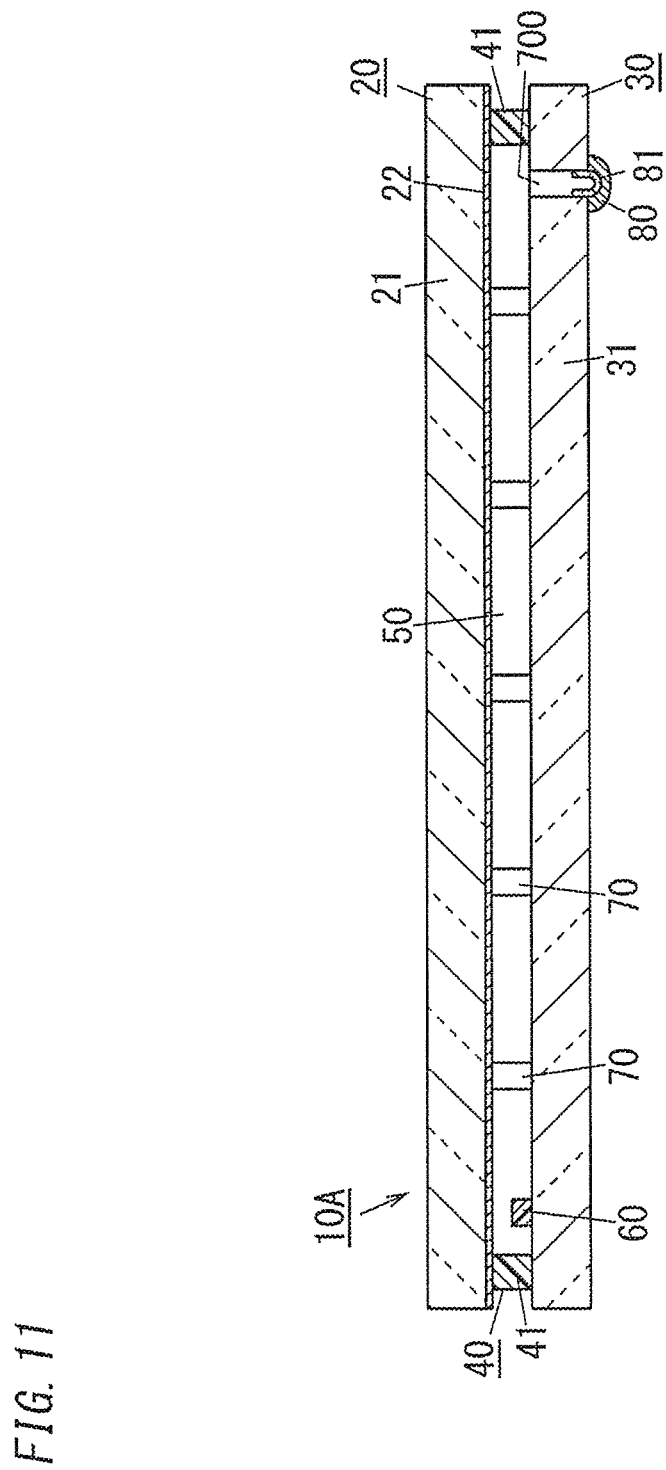
FIG. 11 is a schematic section of a glass panel unit of another example.

FIG. 11 shows a modification of the glass panel unit (referred to as a glass panel unit 10A). In the glass panel unit 10A, the second glass panel 30 includes an outlet 700. The outlet 700 is closed by a seal 81. Accordingly, the evacuated space 50 can be kept in a vacuum state. The seal 81 is made of the evacuation pipe 810. The seal 81 can be made by melting glass forming the evacuation pipe 810, There is a cap 80 disposed outside the seal 81. The cap 80 covers the seal 81. By covering the seal 81 with the cap 80, the outlet 700 can be closed securely, Additionally the cap 80 can suppress breakage of surrounding part of the outlet 700. The glass panel unit 10A is same as the glass panel unit 10 shown in FIG. 1 to FIG. 3 except for the outlet 700, the seal 81, and the cap 80 being provided. The same components as the glass panel unit 10 shown in FIG. 1 to FIG. 3 are designated by the same reference signs as the glass panel unit 10 shown in FIG. 1 to FIG. 3, and descriptions with reference to FIG. 1 to FIG. 3 can apply to the same components. The glass panel unit 10A can be produced by a method in accordance with the production method of the temporary assembly 100. The glass panel unit 10A does not require removal of part including the outlet 700, and thus production therefore can be facilitated.

EXAMPLES

Differences between physical properties of glass panel units including different spacers were examined. Prepared spacers are a spacer made of a film of polyimide having the benzoxazole structures (Example 1), spacers made of a polyimide film not having any benzoxazole structure (Comparative Examples 1 and 2), and a spacer made of stainless steel (Comparative Example 3). The spacer of Example 1 has a diameter of 0.5 mm and a height of 0.116 mm. The spacer of Comparative Example 1 has a diameter of 0.5 mm and a height of 0.125 mm. The spacer of Comparative Example 2 has a diameter of 0.8 mm and a height of 0.125 mm. The spacer of Comparative Example 3 is made of SUS304 and has a diameter of 0.4 mm and a height of 0.15 mm. Dimensions of the spacers are values before they are set in glass panel units.

As for the spacer of Example 1, the polyimide film is formed of "XENOMAX" (registered trademark) available from TOYOBO CO., LTD. The polyimide film of Example 1 is made of polyimide which has a viscoelastic coefficient at 400° C. larger than 500 MPa (that is, 2500 MPa) and a coefficient of thermal expansion at 400° C. smaller than 10 ppm/° C. (that is, about 1 ppm/° C.). As for the spacers of Comparative Examples 1 and 2, the polyimide film is formed of "APICAL" (registered trademark) available from KANEKA COOPERATION. In Comparative Examples 1 and 2, polyimide is a condensate of pyromellitic acid dianhydride and 4,4'-diaminodiphenylether (abbreviated as PDMA/ODA). The polyimide films of Comparative Examples 1 and 2 are made of polyimide which has a viscoelastic coefficient at 400° C. smaller than 500 MPa (that is, 250 MPa) and a coefficient of thermal expansion at 400° C. larger than 10 ppm/° C. (that is, about 28 ppm/° C.).

TABLE 1 shows comparison results of strengths (impact strengths), thermal conductivities (heat transmission coefficients of glass), and spacer diameters, of glass panel units. The impact strength is defined as an average height (unit: cm) from which a ball with a weight of 225 g falls into a glass panel unit and a surface of the glass panel unit is damaged. The heat transmission coefficients of glass (unit: W/m²·K) are measured with thermal conductivity measuring apparatus. The spacer diameters mean spacer diameters after formation of glass panel units. The spacer is sandwiched between the two glass panels, and therefore tends to have a larger spacer diameter than a spacer before set in the glass panel unit. When the spacer diameter becomes excessively large, the spacer is likely to be easily perceivable and thus aesthetic properties are reduced. The impact strength may preferably exceed 50 cm. The thermal conductivity may be preferably equal to or smaller than 1.0 W/m²·K. The spacer diameter may be preferably equal to or smaller than 0.6 mm. TABLE 1 shows that the glass panel unit of Example 1 has high impact strength, low thermal conductivity, and a small spacer diameter. In contrast, the glass panel unit of Comparative Example 3 has low impact strength and high thermal conductivity. The glass panel unit of Comparative Example 2 has high thermal conductivity and a large spacer diameter also. As for Comparative Example 2, the spacers are selected so that the impact strength exceeds 50 cm, but this leads to increases in the spacer diameters. As for Comparative Example 1, the impact strength is low and additionally the spacer diameter is large.

TABLE 2 shows that Example 1A can produce glass panel units with increased strength.

TABLE 2

| Area ratio (%) | Pressure (MPa) | Example 1A Stack of films of polyimide with benzoxazole structures | Comparative Example 1A Stack of films of polyimide without any benzoxazole structure |
|---|---|---|---|
| 0.05 | 204 | good | poor |
| 0.08 | 121 | good | poor |
| 0.13 | 80 | good | good |

TABLE 1

| | | Example 1 | Comparative Example 1 | Comparative Example 2 | Comparative Example 3 |
|---|---|---|---|---|---|
| Spacer (before formation of glass panel unit) | Material | Stack of films of polyimide with benzoxazole structures | Stack of films of polyimide without any benzoxazole structure | Stack of films of polyimide without any benzoxazole structure | SUS304 |
| | Viscoelastic coefficient (400° C.) (MPa) | 2500 | 250 | 250 | — |
| | Diameter (mm) | 0.5 | 0.5 | 0.8 | 0.4 |
| | Height (mm) | 0.116 | 0.125 | 0.125 | 0.15 |
| Impact Strength (cm) | | 55 | 30 | 55 | 25 |
| Heat transmission coefficient of glass (W/m² · K) | | 0.8-0.9 | 1.1-1.2 | 1.1-1.2 | 1.0-1.1 |
| Spacer Diameter after formation of glass panel unit (mm) | | 0.56 | 0.7 | 0.9 | 0.4 |

TABLE 1 allows comparison of spacer diameters after formation of glass panel units between the spacer containing the polyimide with the benzoxazole structures (diameter of 500 μm) and the spacer containing polyimide without any benzoxazole structure (diameter of 500 μm) (Example 1 and Comparative Example 1). The evacuation condition for forming the evacuated space is that a temperature is 450° C. and a time is 15 minutes. As for the spacer containing the polyimide, having the benzoxazole structures, the diameter increases but does not larger than 560 μm. In contrast, as for the spacer containing the polyimide without any benzoxazole structure, the diameter increases to 700 μm. According to the spacer containing the polyimide having the benzoxazole structures, an increase in the spacer diameter can be suppressed.

Further, as for the spacer (Example 1A) containing the polyimide having the benzoxazole structures and the spacer (Comparative Example 1A) containing the polyimide without any benzoxazole structure, pressure properties of glass panel units were compared for different area ratios with regard to the glass panel units. In a case where a glass panel unit is destroyed when the glass panel unit is pressed from opposite surfaces, such a glass panel is rated as "poor". In a case where a glass panel unit is not destroyed when the glass panel unit is pressed from opposite surfaces, such a glass panel is rated as "good". These results are shown in TABLE 2.

Additionally, as for the spacer used in Example 1 and the spacer used in Comparative Example 1, the viscoelastic coefficients and the spacer shapes were examined for different evacuation temperatures in forming glass panel units. The spacer used in Example 1 is made of the polyimide having the benzoxazole structures and has a diameter of 0.5 mm. The spacer used in Comparative Example 1 is made of the polyimide without any benzoxazole structure and has a diameter of 0.5 mm. The pressure of the press is set to 200 MPa. The spacer shapes were visually judged. When crush is found, the spacer is rated as "poor". When no crush is found, the spacer is rated as "good". These results are shown in TABLE 3.

TABLE 3 shows that as for polyimide without any benzoxazole structure a viscoelastic coefficient drastically decreases when a temperature becomes equal to or higher than 300° C., In contrast, as for the polyimide having the benzoxazole structures, a degree of a decrease in a viscoelastic coefficient is relatively small. To suppress crush of the spacer, it is advantageous that a viscoelastic coefficient at 400° C. is larger than 500 MPa. To suppress crush of the spacer, it is advantageous that the ratio (V400/V20) of the viscoelastic coefficient V400 at 400° C. to the viscoelastic coefficient V20 at 20° C. is equal to or larger than 0.1.

TABLE 3

| Evacuation temperature (° C.) | Polyimide (without benzoxazole structure) | | | Polyimide (with benzoxazole structure) | | |
|---|---|---|---|---|---|---|
| | Viscoelastic coefficient (MPa) | Ratio to viscoelastic coefficient at 20° C. | Spacer shape after evacuation | Viscoelastic coefficient (MPa) | Ratio to viscoelastic coefficient at 20° C. | Spacer shape after evacuation |
| 20 | 3500 | 1.00 | good | 6000 | 1.00 | good |
| 100 | 3200 | 0.91 | good | 6000 | 1.00 | good |
| 200 | 3000 | 0.86 | good | 5000 | 0.83 | good |
| 300 | 2000 | 0.57 | good | 4000 | 0.67 | good |
| 350 | 500 | 0.14 | poor | 3500 | 0.58 | good |
| 400 | 250 | 0.07 | poor | 2500 | 0.42 | good |
| 450 | 200 | 0.06 | poor | 2000 | 0.33 | good |

The invention claimed is:

1. A glass panel unit comprising:
a first glass panel;
a second glass panel placed opposite the first glass panel;
a seal with a frame shape hermetically bonding the first glass panel and the second glass panel to each other;
an evacuated space enclosed by the first glass panel, the second glass panel, and the seal; and
at least one spacer placed between the first glass panel and the second glass panel, wherein:
the at least one spacer is a stack of two or more films,
at least one film of the two or more films contains a polymer having a viscoelastic coefficient at 400° C. larger than 500 MPa, and
the polymer has a coefficient of thermal expansion at 400° C. smaller than 10 ppm/° C.

2. The glass panel unit of claim 1, wherein
the evacuated space is made to be in a vacuum state through evacuation with heating.

3. The glass panel unit of claim 2, wherein
a temperature for the heating is equal to or higher than 300° C.

4. The glass panel unit of claim 1, wherein
the first glass panel and the second glass panel each are devoid of an outlet.

5. The glass panel unit of claim 1, wherein
an area ratio of the at least one spacer to the glass panel unit in a plan view is in a range of 0.01 to 0.2%.

6. The glass panel unit of claim 1, wherein
the at least one spacer contains at least one material selected from glass, metal, ceramic, and graphite.

7. The glass panel unit of claim 1, wherein
a ratio of a viscoelastic coefficient V400 of the polymer at 400° C. to a viscoelastic coefficient V20 of the polymer at 20° C. (V400/V20) is equal to or larger than 0.1.

* * * * *